US012658558B2

(12) United States Patent
Takeuchi et al.

(10) Patent No.: US 12,658,558 B2
(45) Date of Patent: Jun. 16, 2026

(54) VEHICLE ANTENNA SYSTEM

(71) Applicant: AGC Inc., Tokyo (JP)

(72) Inventors: Shoichi Takeuchi, Tokyo (JP); Hideaki Shoji, Tokyo (JP); Toshiki Sayama, Tokyo (JP); Yusuke Kato, Tokyo (JP)

(73) Assignee: AGC Inc., Tokyo (JP)

( * ) Notice: Subject to any disclaimer, the term of this patent is extended or adjusted under 35 U.S.C. 154(b) by 137 days.

(21) Appl. No.: 18/290,348

(22) PCT Filed: May 10, 2022

(86) PCT No.: PCT/JP2022/019791

§ 371 (c)(1),
(2) Date: Nov. 13, 2023

(87) PCT Pub. No.: WO2022/239768

PCT Pub. Date: Nov. 17, 2022

(65) Prior Publication Data

US 2024/0258681 A1 Aug. 1, 2024

(30) Foreign Application Priority Data

May 14, 2021 (JP) ................................ 2021-082333

(51) Int. Cl.
*H01Q 1/12* (2006.01)
*H01Q 1/32* (2006.01)
(Continued)

(52) U.S. Cl.
CPC ......... *H01Q 1/1271* (2013.01); *H01Q 1/3275* (2013.01); *H01Q 1/48* (2013.01); *H01Q 9/0414* (2013.01)

(58) Field of Classification Search
None
See application file for complete search history.

(56) References Cited

U.S. PATENT DOCUMENTS 5,633,645 A 5/1997 Day
6,014,110 A 1/2000 Bridges
(Continued)

FOREIGN PATENT DOCUMENTS

EP 899810 A2 3/1999
JP H0255706 U 4/1990
(Continued)

OTHER PUBLICATIONS

International Search Report for Application No. PCT/JP2022/019791 dated Jul. 26, 2022, 3 pages.
(Continued)

*Primary Examiner* — Crystal L Hammond
(74) *Attorney, Agent, or Firm* — Howard & Howard Attorneys PLLC

(57) ABSTRACT

Provided is a vehicle antenna system that is able to efficiently receive circularly polarized signals from the zenith direction. A vehicle antenna system (100) is provided with window glass (30) for a vehicle (20) and an antenna element (40) that is able to receive signals of a predetermined frequency band. The antenna element (40) is provided on a first principal plane of a dielectric substrate (43), and includes a radiating conductor (41) that is able to receive circularly polarized signals of a first frequency, and a grounding conductor (44) positioned opposite the radiating conductor (41) via the dielectric substrate (43). The normal direction of the first principal plane is less than or equal to 45° relative to the vertical direction, and the radiating conductor (41) is positioned away from the inner surface of the window glass (30) via the dielectric layer (60) in the direction of the vehicle interior.

13 Claims, 25 Drawing Sheets

200

(51) Int. Cl.
*H01Q 1/48* (2006.01)
*H01Q 9/04* (2006.01)

(56) References Cited

U.S. PATENT DOCUMENTS

| | | | | |
|---|---|---|---|---|
| 11,444,367 | B2 | 9/2022 | Brockett et al. | |
| 2006/0109178 | A1 | 5/2006 | Takeuchi et al. | |
| 2009/0058731 | A1* | 3/2009 | Geary | H01Q 5/378 343/700 MS |
| 2009/0289852 | A1 | 11/2009 | Li et al. | |
| 2016/0261047 | A1* | 9/2016 | Wallace | H01Q 5/40 |
| 2021/0210857 | A1* | 7/2021 | Sayama | H01Q 9/0457 |

FOREIGN PATENT DOCUMENTS

| | | | | |
|---|---|---|---|---|
| JP | H0563424 | A * | 3/1993 | H01Q 1/32 |
| JP | H0680971 | B2 | 10/1994 | |
| JP | H10276034 | A | 10/1998 | |
| JP | 2005130532 | A | 5/2005 | |
| JP | 2006173895 | A | 6/2006 | |
| JP | 2007251936 | A | 9/2007 | |
| JP | 2008135931 | A | 6/2008 | |
| JP | 2018067881 | A | 4/2018 | |
| JP | 2019193167 | A | 10/2019 | |
| WO | 2019177144 | A1 | 9/2019 | |
| WO | 2020071390 | A1 | 4/2020 | |

OTHER PUBLICATIONS

Machine-assisted English translation for JPH 02-55706 U extracted from www.google.com on Nov. 15, 2023, 4 pages.

English language abstract and machine-assisted English translation for JPH 05-63424 A extracted from espacenet.com database on Nov. 12, 2023, 5 pages.

English language abstract and machine-assisted English translation for JPH 06-80971 B2 extracted from espacenet.com database on Nov. 12, 2023, 10 pages.

English language abstract and machine-assisted English translation for JPH 10-276034 A extracted from espacenet.com database on Nov. 12, 2023, 17 pages.

English language abstract and machine-assisted English translation for JP 2005-130532 A extracted from espacenet.com database on Nov. 12, 2023, 28 pages.

English language abstract and machine-assisted English translation for JP 2006-173895 A extracted from espacenet.com database on Nov. 12, 2023, 9 pages.

English language abstract for JP 2007-251936 A extracted from espacenet.com database on Nov. 12, 2023, 2 pages.

English language abstract and machine-assisted English translation for JP 2008-135931 A extracted from espacenet.com database on Nov. 12, 2023, 10 pages.

English language abstract and machine-assisted English translation for JP 2018-067881 A extracted from espacenet.com database on Nov. 12, 2023, 20 pages.

English language abstract and machine-assisted English translation for JP 2019-193167 A extracted from espacenet.com database on Nov. 10, 2023, 26 pages.

English language abstract for WO 2019/177144 A1 extracted from espacenet.com database on Nov. 10, 2023, 2 pages.

English language abstract for WO 2020/071390 A1 extracted from espacenet.com database on Nov. 12, 2023, 2 pages.

* cited by examiner

VEHICLE ANTENNA SYSTEM

CROSS-REFERENCE TO RELATED APPLICATIONS

The present application is the National Stage of International Patent Application No. PCT/JP2022/019791, filed May 10, 2022, which claims priority to and all the benefits of Japanese Patent Application No. 2021-082333, filed May 14, 2021, the entire contents of which are herein incorporated by reference.

The present invention relates to a vehicle antenna system.

BACKGROUND OF THE INVENTION

In recent years, vehicles such as automobiles have been equipped with antennas to receive signals transmitted from satellites, and satellite positioning systems have been introduced to receive radio waves at a predetermined frequency in the GHz band. For example, Patent Document 1 discloses a patch antenna that is able to receive Global Navigation Satellite System (GNSS) signals in a plurality of frequency bands. Patent Document 1 discloses an example in which patch antenna is mounted on a vehicle roof and housed inside a radio wave-permeable antenna case.

Japanese Unexamined Patent Application No. 2019-193167

SUMMARY OF THE INVENTION

Problem to be Solved by the Invention

As disclosed in Patent Document 1, an antenna element capable of receiving signals from satellites is housed inside an antenna case on the roof of a vehicle in order to improve directivity in the zenith direction. In addition to this antenna element, other antenna elements may be aggregated and placed inside an antenna case on the roof of a car. Therefore, when these antenna elements are placed inside an antenna case on the roof of a car, the structure inside the antenna case becomes more complicated, and there is a risk of interference with antennas transmitting and receiving radio signals in a frequency band different from that of signals from satellites. In these cases, the antenna elements may not achieve the desired reception performance and may not be able to efficiently receive circularly polarized signals from the zenith direction, such as GNSS signals. In addition, some types of automobiles do not have a protruding antenna case (so-called shark fin) on the roof. In these cases, the antenna is placed inside the automobile or embedded in a plastic case without a protrusion. In addition, more than one of these above antenna elements may be mounted on an automobile, for example, in an antenna case on the roof and one in another location.

The object of the present invention is to provide a vehicle antenna system in which an antenna element is not located in an antenna case with a projection on the exterior roof of a vehicle, but in another location, yet which can efficiently transmit and receive circularly polarized signals from the zenith direction.

Means for Solving the Problem

One aspect of the present invention is a vehicle antenna system comprising: window glass for a vehicle; and an antenna element that is able to receive signals in a predetermined frequency band, the antenna element including a first radiating conductor that is provided on a first principal plane of a first dielectric substrate and that is able to receive circularly polarized signals of a first frequency, and a grounding conductor positioned opposite the first radiating conductor via the first dielectric substrate, the normal direction of the first principal plane is less than or equal to 45° relative to the vertical direction, and the first radiating conductor is positioned away from the inner surface of the window glass via the dielectric layer in the direction of the vehicle interior.

In this vehicle antenna system, optionally, the first radiating conductor is positioned parallel to the inner surface of the window glass, and the inequality $$1 \leq \varepsilon_r \leq (-0.097648 \times f + 173.47) \times t(^{0.000125185 \times f \times f - 0.0395272 \times f + 311.375})$$

is satisfied at 0.5 mm≤t≤16 mm, where the relative permittivity of the dielectric layer is εr, the thickness of the dielectric layer is t [mm], and the first frequency is f [MHz].

In this vehicle antenna system, optionally, the antenna element further comprises a second radiating conductor positioned opposite the first radiating conductor via the first dielectric substrate, the grounding conductor is positioned opposite the first and second radiating conductors via a second dielectric substrate, and the second radiating conductor is able to receive circularly polarized waves of a second frequency that is lower than the first frequency.

In this vehicle antenna system, optionally, the first radiating conductor is positioned parallel to the inner surface of the window glass, and the inequality $$1 \leq \varepsilon_r \leq \left(-0.00197869 \times f^2 + 6.18143 \times f + 4817.72\right) \times t^{(0.0001538 \times f \times f - 0.317206 \times f + 247.206)}$$

is satisfied at 0.5 mm≤t≤16 mm, where the relative permittivity of the dielectric layer is εr, the thickness of the dielectric layer is t [mm], and the first frequency is f [MHz].

In this vehicle antenna system, optionally, the first radiating conductor is positioned non-parallel to the inner surface of the window glass.

In this vehicle antenna system, optionally, the antenna element further comprises a second radiating conductor positioned opposite the first radiating conductor via the first dielectric substrate, the grounding conductor is positioned opposite the first and second radiating conductors via a second dielectric substrate, and the second radiating conductor is able to receive circularly polarized waves of a second frequency that is lower than the first frequency.

In this vehicle antenna system, optionally, the first radiating conductor is positioned at an angle of 20° to 25° to the inner surface of the window glass, and the inequality $$0.5 \leq \varepsilon_r \leq 7.11882 \times t_{min}^{-0.385302}$$

is satisfied at 0.5 mm≤$t_{min}$≤16 mm, the where relative permittivity of the dielectric layer is εr and the minimum thickness of the dielectric layer is $t_{min}$ [mm].

In this vehicle antenna system, optionally, the dielectric layer includes an air layer.

In this vehicle antenna system, optionally, the dielectric layer includes an air layer adjacent to the inner surface of the window glass and a non-air layer adjacent to the air layer that is different from air.

In this vehicle antenna system, optionally, the first radiating conductor is mounted with a plane of the first radiating conductor at an angle of 0° to 30° to the horizontal plane.

In this vehicle antenna system, optionally, the window glass is mounted at an angle of 0° to 30° to the horizontal plane.

In this vehicle antenna system, optionally, the window glass includes a windshield.

In this vehicle antenna system, optionally, the window glass includes roof glass, and a plane of the first radiating conductor is parallel to the horizontal plane.

Effect of the Invention

An aspect of the present invention is able to provide a vehicle antenna system in which an antenna element is not located in an antenna case with a projection on the exterior roof of a vehicle, but in another location, yet which can efficiently transmit and receive circularly polarized signals from the zenith direction.

DETAILED DESCRIPTION OF THE INVENTION

Figure 1:
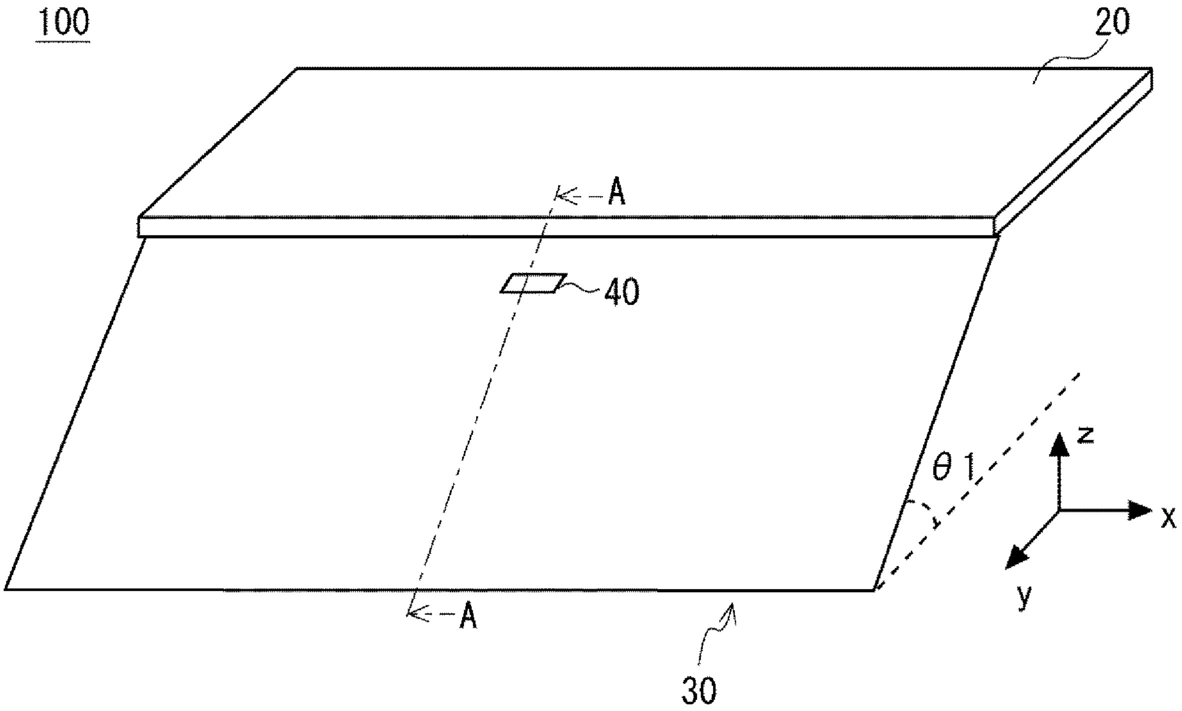
FIG. 1 is a perspective view of vehicle in which the vehicle antenna system in Example 1 has been installed.

Specific embodiments in which the present invention has been applied will now be described in detail with reference to the drawings. However, the present invention is not limited to the following embodiments. For clarity of explanation, the description and drawings have been abbreviated or simplified where appropriate. In each drawing, identical elements are denoted by the same reference numbers, and redundant explanations have been omitted where necessary. In each embodiment, directions such as parallel, horizontal, and vertical are allowed to deviate to the extent that the effect of the invention is not impaired. In the drawings used to explain the embodiments, the direction on the drawing shall apply where not specifically mentioned.

First Embodiment

Example 1

The configuration of the vehicle antenna system 100 according to Example 1 of the first embodiment will now be described using FIG. 1. FIG. 1 is a perspective view of vehicle in which the vehicle antenna system in Example 1 has been installed. The vehicle antenna system 100 is mounted on a vehicle 20 and includes window glass 30 and an antenna element 40.

The window glass 30 may be a windshield, roof glass, or rear glass. The window glass 30 is mounted in a window frame (not shown) of the vehicle 20 at a predetermined installation angle (angle θ1) relative to the traveling surface of the vehicle 20. In other words, the window glass 30 is mounted in the window frame of the vehicle 20 at an angle θ1 relative to the horizontal plane. Angle θ1 may be, for example, 0° to 45°, 0° to 30°, or 20 to 25°. The details of the window glass 30 are described below. When angle θ1 is approximately 0°, the example is roof glass arranged so that the normal direction of the glass surface is roughly aligned with the zenith direction. In the present embodiment, the window glass 30 is windshield, unless otherwise specified.

In FIG. 1, the vehicle antenna system 100 is depicted with a configuration consisting of a sheet of window glass 30 and a single antenna element 40, but the system may have two or more sheets of window glass 30 and the same number of antenna elements 40 as sheets of window glass 30. In this case, the window glass 30 may include two or more sheets of windshield glass, roof glass, and rear glass, and an antenna element 40 may be provided in more than one sheet of window glass 30.

The antenna element 40 is an antenna element that is able to receive signals in a predetermined frequency band. Specifically, the antenna element 40 may be configured to receive GNSS signals in a predetermined frequency band, transmitted from the zenith direction in circularly polarized waves. The predetermined frequency band may be the 1.2 GHz band or the 1.6 GHz band. The 1.2 GHz band may be, for example, 1.226 GHz to 1.228 GHZ, and the 1.6 GHz band may be, for example, 1.559 GHz to 1.606 GHz. In addition, the antenna element 40 may be configured to receive Satellite Digital Audio Radio Service (SDARS) signals in the S-band (2.320 GHz to 2.345 GHZ) of the 2.3 GHz band. Note that in the present embodiment, the antenna element 40 is an antenna element capable of receiving GNSS signals that are circularly polarized in the 1.6 GHz band.

The antenna element 40 may be positioned in a location that does not obstruct the view of the occupants of the vehicle 20, for example, near the upper edge of the window glass 30. The antenna element 40 may be fixed near the window glass 30 via a case located in the interior of the vehicle 20.

Figure 2:
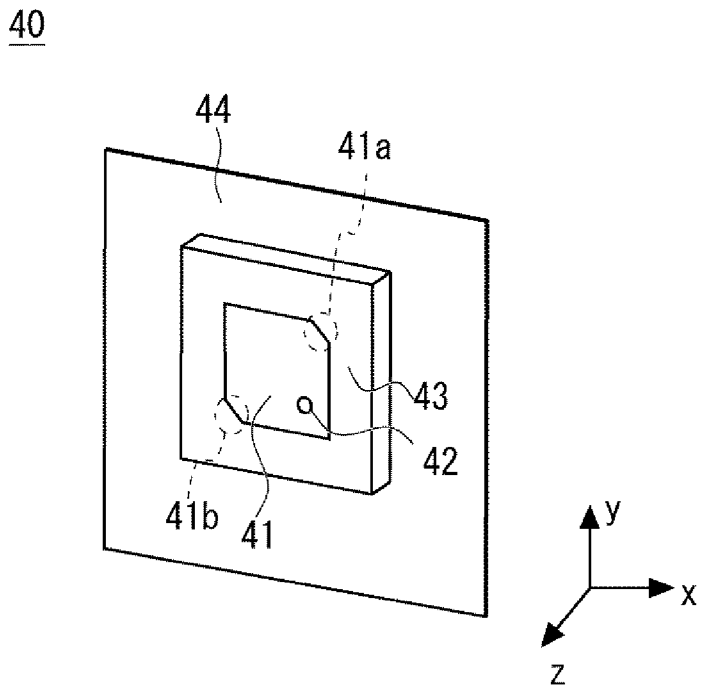
FIG. 2 is a diagram showing an antenna element configuration according to Example 1.

FIG. 2 will now be used to explain a configuration of the antenna element 40 according to Example 1. FIG. 2 shows a diagram of the antenna element 40 in Example 1, and the antenna element 40 has a radiating conductor 41, a dielectric substrate 43, and a grounding conductor 44.

The radiating conductor 41 is provided on a first main plane, which is the principal plane (x-y plane) of the dielectric substrate 43 on the positive side of the z-axis. In other words, the radiating conductor 41 is a patch antenna located on the first principal plane of the dielectric substrate 43, which is located on the radiating direction side from which the radiating conductor 41 radiates radio waves. The radiating conductor 41 is configured to receive GNSS signals, which can be, for example, circularly polarized signals in the predetermined frequency bands described above. As shown in FIG. 2, the radiating conductor 41 is basically rectangular in shape, but has cutaway portions 41*a*, 41*b* in opposite corners of the radiating conductor 41. Thus, the radiating conductor 41 is configured with cutaway portions 41*a*, 41*b* to receive circularly polarized signals. The cutaway portions 41*a*, 41*b* correspond to known degaussing elements and perturbation elements, and the area of the portions to be removed from a square without cutaway portions 41*a*, 41*b* is the area defined by the degaussing method. The radiating conductor 41 has a power supply point 42. The radiating conductor 41 is connected at the power supply point 42 to a signal line of a transmission line, such as a coaxial cable or microstrip line (not shown), via a conductor (not shown) extending in the thickness direction. The transmission line supplying power to the antenna element 40 will be described below in the form of a coaxial cable.

The dielectric substrate 43 can be, for example, a ceramic substrate, but may also be a resin substrate. As mentioned above, the radiating conductor 41 is provided on the first principal plane of the dielectric substrate 43. The grounding conductor 44 is provided on a second principal plane opposite the first principal plane of the dielectric substrate 43. In other words, the grounding conductor 44 is positioned opposite the radiating conductor 41 via the dielectric substrate 43. There is a conductor inside the dielectric substrate 43 (not shown) in the thickness direction corresponding to the power supply point 42 on the radiating conductor 41.

The grounding conductor 44 is a conductor that forms the ground plane. The grounding conductor 44 is connected via a grounding wire, which is an outer conductor of the coaxial cable (not shown), and forms the ground plane. The grounding conductor 44 is separated from the conductor (not shown) formed in the thickness direction of the dielectric substrate 43.

Figure 3:
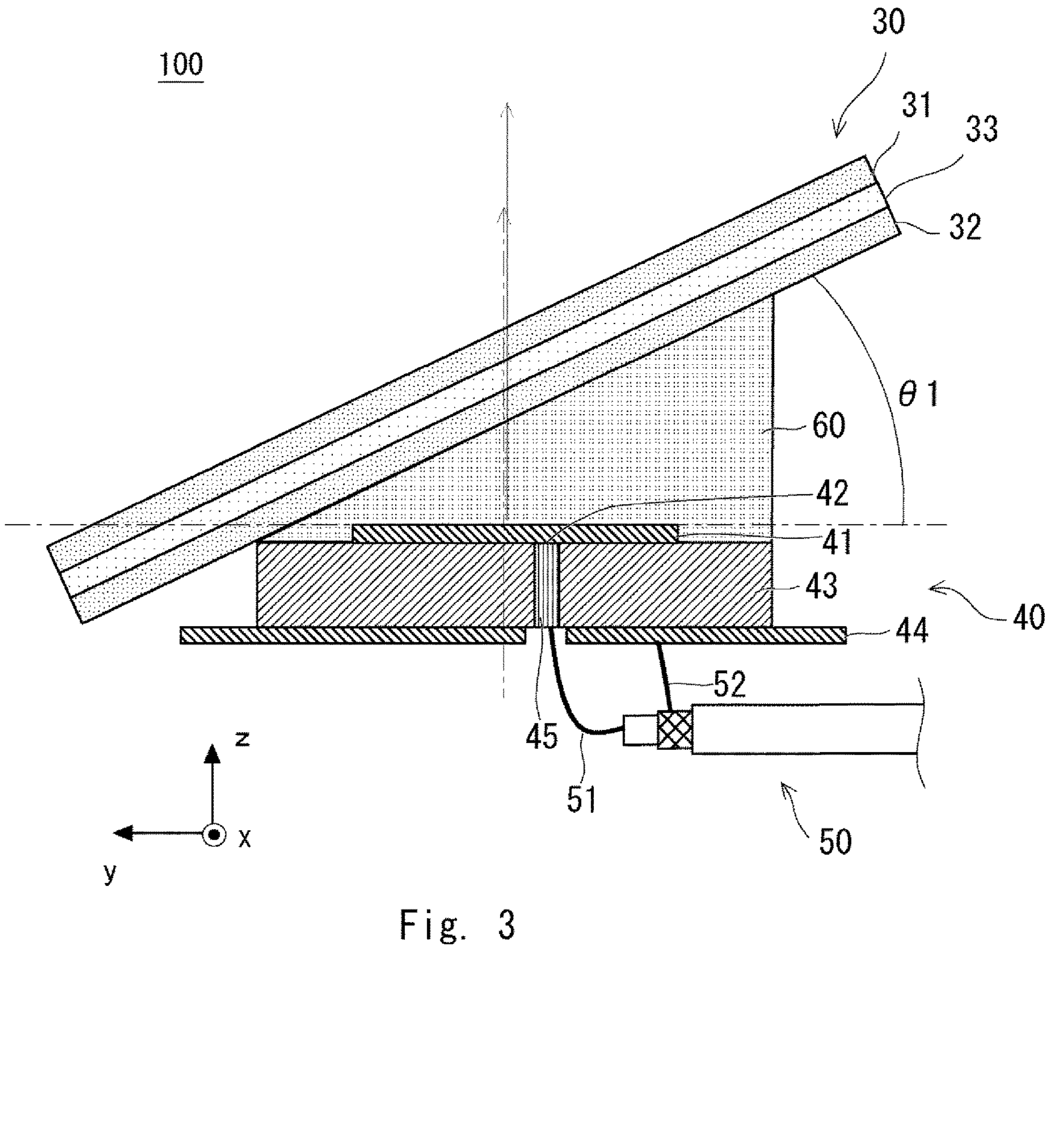
FIG. 3 is a diagram used to explain an arrangement of an antenna element in the vehicle antenna system according to Example 1.

Next, FIG. 3 is used to describe the details of each configuration of the vehicle antenna system 100 in Example 1 and the arrangement of the antenna element 40. FIG. 3 is an enlarged cross-sectional view of the antenna element 40 in FIG. 1 when cut along cut line A-A through the power supply point 42 of the antenna element 40. The cross-section is a plane orthogonal to the horizontal plane.

As shown in FIG. 3, the vehicle antenna system 100 includes window glass 30, an antenna element 40, a coaxial cable 50, and a dielectric layer 60. Redundant explanation of the window glass 30 and the antenna element 40 described above has been omitted where appropriate.

The window glass 30 is laminated glass with a first glass plate 31, a second glass plate 32, and an interposed film 33 interposed between the first glass plate 31 and the second glass plate 32. At least one of the first glass plate 31 and the second glass plate 32 is glass that satisfies the following relationships in terms of composition expressed in mole percentages with reference to oxides. The glass may include 50 to 80% $SiO_2$, 0 to 10% $B_2O_3$, 0.1 to 25% $Al_2O_3$, 3 to 30% of at least one alkali metal oxide selected from the group consisting of $Li_2O$, $Na_2O$ and $K_2O$, 0~25% MgO, 0 to 25% CaO, 0 to 5% SrO, 0 to 5% BaO, 0 to 5% $ZrO_2$, and 0 to 5% $SnO_2$, but the glass is not limited to these compositions. The window glass 30 is not limited to laminated glass. It may also be a single sheet of glass. In the case of a single sheet of glass, glass with a composition described above may be used, but the glass is not limited to these compositions.

The interposed film 33 can be made of a material such as polyvinyl butyral (PVB), ethylene vinyl acetate (EVA), cyclo-olefin polymer, urethane resin, or polyvinylidene fluoride resin (PVDF), etc. A thermosetting resin that is a liquid before being heated may also be used. In other words, the interposed film 33 only has to be provided in a laminated state when the window glass 30 is laminated glass, and the interposed film 33 may be in a liquid state before the first glass plate 31 and the second glass plate 32 are joined together.

The antenna element 40 has a radiating conductor 41, a dielectric substrate 43, a grounding conductor 44, and a conductor 45. The radiating conductor 41 is supplied power by being connected via the conductor 45 to the signal line 51, which is an internal conductor in the coaxial cable 50. The radiating conductor 41 is positioned away from the inner surface of the window glass 30 via the dielectric layer 60 in the direction of the vehicle interior.

The radiating conductor 41 may be positioned non-parallel to the inner surface of the window glass 30 or parallel to the inner surface of the window glass 30. Specifically, the antenna element 40 may be mounted so that the plane of the radiating conductor 41 is at an angle of 0° to 25° to the horizontal plane. In other words, the antenna element 40 may be mounted on the window glass 30 so that the plane of the radiating conductor 41 faces the zenith direction, or the plane of the radiating conductor 41 may be parallel to the window glass 30.

When the window glass 30 is roof glass, the antenna element 40 may be mounted on the window glass 30 so that the plane of the radiating conductor 41 is roughly parallel to the horizontal plane (for example, 0° to 10°). If angle $\theta 1$ of the inner surface of the window glass 30 to the horizontal plane is 0° to 30°, the antenna element 40 may be mounted so that the plane of the radiating conductor 41 is at an angle of 0° to 30° to the horizontal plane.

The antenna element 40 may be mounted on the window glass 30 so that the radiating conductor 41 has a normal direction of 0° to 45° to the vertical direction. In other words, the antenna element 40 may be positioned on the window glass 30 so that the normal direction of the first principal plane of the dielectric substrate 43 is 45° or less relative to the vertical direction. In FIG. 3, the dotted arrow indicates the vertical direction, and the solid arrow indicates the normal direction of the first principal plane.

The dielectric substrate 43 has a conductor 45 arranged in the thickness direction corresponding to the position of the power supply point 42 shown in FIG. 2. Grounding conductor 44 is connected to a ground wire 52, which is an outer conductor of the coaxial cable 50. The coaxial cable 50 is a transmission line for the antenna element 40, with one end connected to the antenna element 40 and the other end connected to communication equipment (not shown). The signal line 51, which is an inner conductor of the coaxial cable 50, is connected to the conductor 45 of the antenna element 40, and via the conductor 45 to the radiating conductor 41. The ground wire 52, which is an outer conductor of the coaxial cable 50, is connected to the grounding conductor 44 of the antenna element 40.

The dielectric layer 60 may include, for example, an air layer or a non-air layer. The non-air layer may be, for example, resin or glass. The dielectric layer 60 may consist of multiple layers of air and resin, in which case the relative permittivity of the dielectric layer 60 can be adjusted by selecting the appropriate resin thickness and resin material. If the dielectric layer 60 includes a non-air layer, it may include two or more dielectrics with different relative permittivities.

As mentioned above, in the vehicle antenna system 100, the radiating conductor 41 is positioned away from the inner surface of the window glass 30 via a dielectric layer 60 in the direction of the vehicle interior. In other words, the vehicle antenna system 100 is mounted on the window glass 30 so that the radiating conductor 41 does not make contact with the window glass 30. In this way, the vehicle antenna system 100 can adjust the (GNSS) signal receiving plane of the radiating conductor 41 to an angle other than angle θ1 relative to the horizontal plane of the window glass 30. In the vehicle antenna system 100, the antenna element 40 is mounted on the window glass 30 so that the normal direction of the first principal plane of the radiating conductor 41 is 45° or less relative to the vertical direction. In this way, the antenna element 40 can efficiently receive circularly polarized signals from the zenith direction, even when the antenna element 40 is located inside the vehicle rather than in an antenna case on the exterior roof of the vehicle. In addition, the vehicle antenna system 100 can receive circularly polarized signals from the zenith direction more efficiently by satisfying the equations described below.

Example 2

Figure 4:
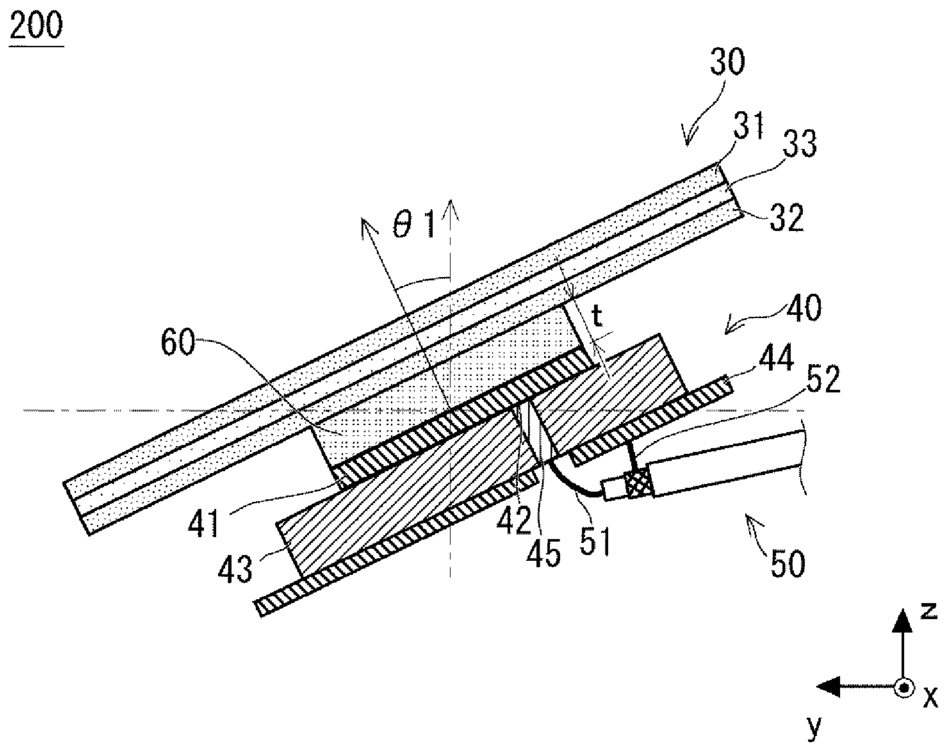
FIG. 4 is a diagram used to explain an arrangement of an antenna element in the vehicle antenna system according to Example 2.

Example 2 will now be described. Example 2 is a specific example of Example 1 and an example configuration of the vehicle antenna system 200 will be described using FIG. 4. FIG. 4 is an enlarged cross-sectional view of the antenna element 40 in FIG. 1 when cut along cut line A-A at the power supply point 42, and the cross section is a plane orthogonal to the horizontal plane.

In the vehicle antenna system 200 according to Example 2, the plane of the radiating conductor 41 in the antenna element 40 is positioned parallel to the inner surface of the window glass 30. The configurations of the window glass 30, the antenna element 40, the coaxial cable 50, and the dielectric layer 60 are the same as those in Example 1, so a further description has been omitted.

In the present embodiment, the window glass 30 is a windshield, and angle θ1 can be, for example, 20° to 25°. As a result, the plane of the radiating conductor 41 is positioned at the same angle as angle θ1 with respect to the horizontal plane. As shown in FIG. 4, the angle formed by the normal direction of the first principal plane of the dielectric substrate 43 and the vertical direction is also the same as angle θ1.

The dielectric layer 60, for example, may be an air layer, a non-air layer, or multiple layers of both. Here, the relative permittivity of the dielectric layer 60 can be adjusted by selecting the appropriate resin thickness and resin material. When the dielectric layer 60 includes a non-air layer, it may consist of two or more dielectrics with different relative permittivities, each of the same thickness. When the radiating conductor 41 is positioned parallel to the inner surface of the window glass 30, as in Example 2, the thickness t [mm] of the dielectric layer 60 may be 0.5 mm to 16 mm. When the thickness t of the dielectric layer 60 is 0.5 mm to 16 mm, the relative permittivity $\varepsilon^r$ of the dielectric layer 60 may satisfy Equation (1) below. Here, the frequency of the signals received by the radiating conductor 41 is f [MHz].

Equation 1

$$1 \leqq \varepsilon_r \leqq (-0.097648 \times f + 173.47) \times t^{(0.000125185 \times f \times f - 0.395272 \times f + 311.375)} \quad (1)$$

In other words, the vehicle antenna system 200 according to Example 2 may be set so that the thickness t of the dielectric layer 60 is 0.5 mm to 16 mm and the relative permittivity satisfies Equation (1). When the thickness t exceeds 16 mm, the distance from the window glass 30 increases, resulting in less space inside the car. When the thickness t is less than 0.5 mm, the relative permittivity in the dielectric layer 60 becomes difficult to adjust, and the desired reception performance may not be realized.

Next, the reception performance of the antenna element 40 in the vehicle antenna system 200 according to Example 2 will be explained using the front-to-back (FB) ratio of the antenna element 40. The FB ratio is an index value indicating the ratio of radiated power [dB] between the radio wave emitting direction of the antenna element 40 (front direction) and the direction opposite the radio wave emitting direction of the antenna element 40 (back direction). The FB ratio in the vehicle antenna system 200 according to Example 2 was determined by simulation using the power [dB] in the radio wave emitting direction (front direction) of the antenna element 40 and the power [dB] in the direction opposite the radio wave emitting direction (back direction) of the antenna element 40. The FB ratio of the antenna element is used for each vehicle antenna system described below, and it has been determined that the antenna gain of the antenna elements are not significantly degraded compared when the antenna element is installed on the roof outside of the vehicle. In subsequent descriptions, the FB ratio will also be referred to as "the FB ratio."

The reception performance of the vehicle antenna system 200 was evaluated by calculating FB ratios [dB] when the thickness t [mm] of the dielectric layer 60 and the relative permittivity $\varepsilon_r$ of the dielectric layer 60 were varied, and then comparing the calculated FB ratio with a reference FB ratio. The reference FB ratio is the FB ratio when the antenna element 40 is not attached to the window glass 30 (reference state), and was set to 5 [dB] based on prior measurements. The evaluation indicates that if the calculated FB ratio is higher than the reference FB ratio, the reception performance of the vehicle antenna system 200 is higher than the reception performance in the reference state. In other words, if the FB ratio is higher than the reference FB ratio, the reception performance of the vehicle antenna system 200 was rated as high, even when the antenna element 40 is mounted on the window glass 30.

In order to evaluate the FB ratio of the vehicle antenna system 200 according to Example 2, the simulation conditions were set as follows. The dielectric substrate 43 is a ceramic material.

Frequency f [MHz] of signal received by antenna element 40: 1574 [MHz] (=1.574 [GHz])

Size of radiating conductor 41 in antenna element 40: 18 [mm]×18 [mm]

Size of grounding conductor 44 in antenna element 40: 70 [mm]×70 [mm]

Size of dielectric substrate 43 in antenna element 40: 70 [mm]×70 [mm]

Thickness of dielectric substrate 43 in antenna element 40: 60 [mm]

Size of window glass 30 on which antenna element 40 is placed: 200 [mm]×200 [mm]

Figure 5:
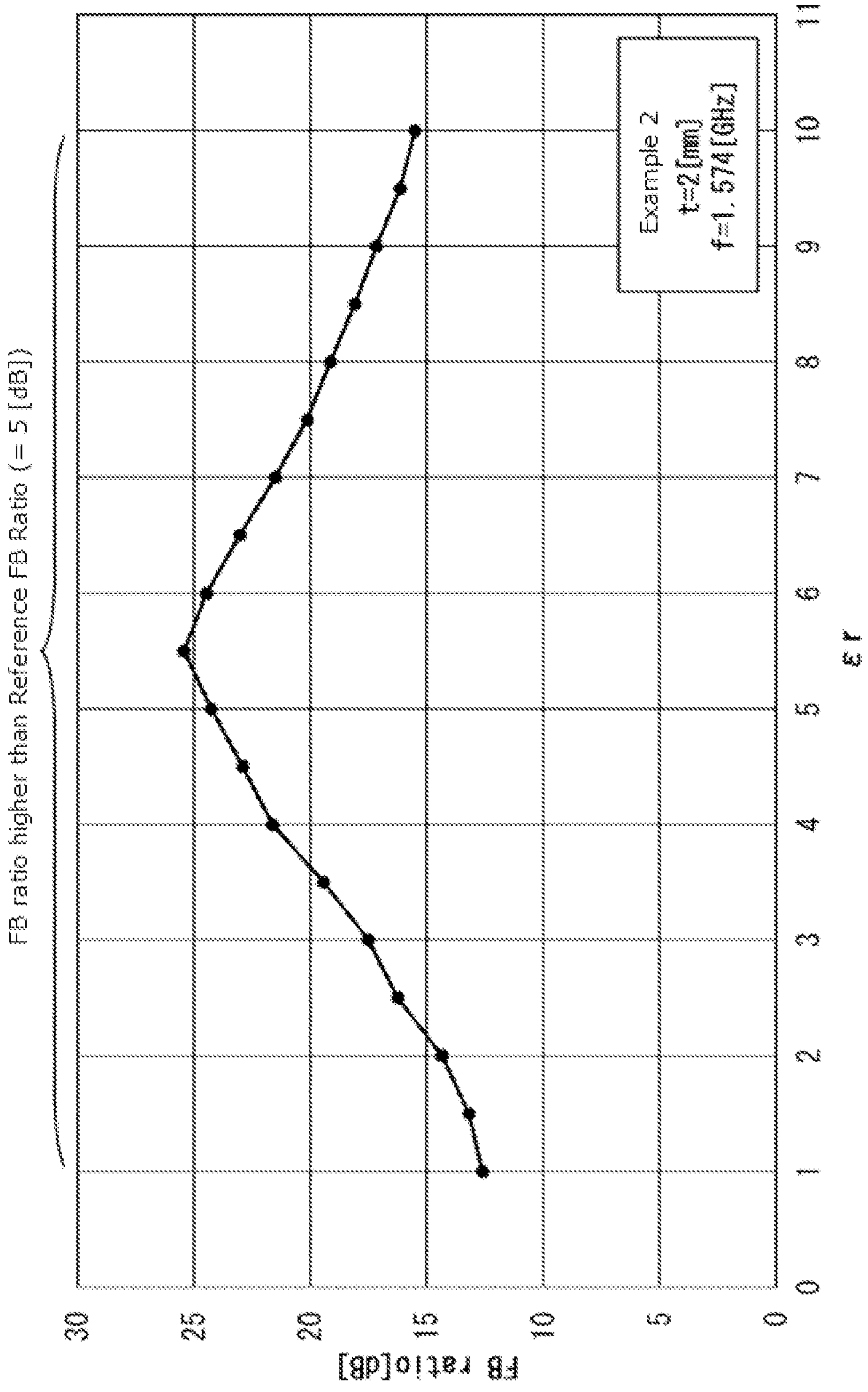
FIG. 5 is a graph showing the relationship between the relative permittivity of the dielectric layer and the FB ratio.

First, FIG. 5 is used to show the relationship between the relative permittivity $\varepsilon_r$ of the dielectric layer 60 and the FB ratio at a dielectric layer 60 thickness t of 2 mm. FIG. 5 is a graph showing the relationship between the relative permittivity of the dielectric layer and the FB ratio. The horizontal axis in FIG. 5 indicates the relative permittivity of the dielectric layer, and the vertical axis indicates the FB ratio.

As shown in FIG. 5, at a dielectric layer 60 thickness t of 2 mm, the FB ratio of the vehicle antenna system 200 was higher than the reference FB ratio in the relative permittivity $\varepsilon_r$ range of 1 to 10. At each relative permittivity with a higher FB ratio, Equation (1) was found to be satisfied when calculated using a thickness t of 2 mm and a frequency f of 1574 MHz. In other words, in the vehicle antenna system 200 according to Example 2, the FB ratio improves and GNSS signals, which are circularly polarized signals from the zenith direction, can be efficiently received when the relationship between the thickness t [mm] of the dielectric layer 60, the relative permittivity $\varepsilon_r$, and the frequency f [MHz] satisfies Equation (1).

Figure 6:
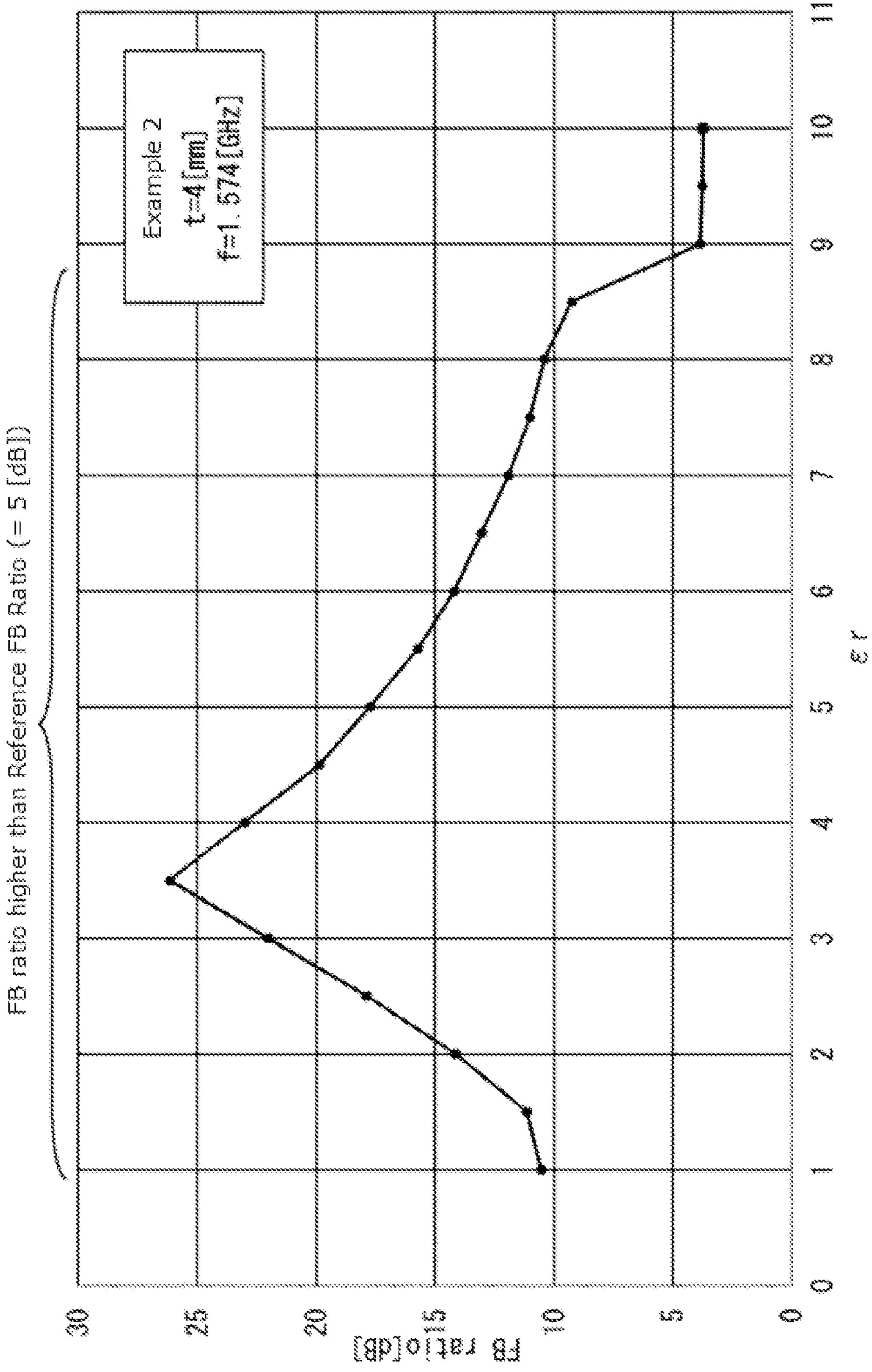
FIG. 6 is a graph showing the relationship between the relative permittivity of the dielectric layer and the FB ratio.

FIG. 6 is used to show the relationship between the relative permittivity $\varepsilon_r$ of the dielectric layer 60 and the FB ratio at a dielectric layer 60 thickness t of 4 mm. FIG. 6 is a graph showing the relationship between the relative permittivity of the dielectric layer and the FB ratio. The horizontal axis and the vertical axis indicating the relationship between the relative permittivity of the dielectric layer and the FB ratio in FIG. 6 and subsequent figures are the same as those in FIG. 5, so further explanation has been omitted.

As shown in FIG. 6, at a dielectric layer 60 thickness t of 4 mm, the FB ratio of the vehicle antenna system 200 was higher than the reference FB ratio in the relative permittivity $\varepsilon_r$ range of 1 to 8.9. At each relative permittivity with a higher FB ratio, Equation (1) was found to be satisfied when calculated using a thickness t of 4 mm and a frequency f of 1574 MHz.

Figure 7:
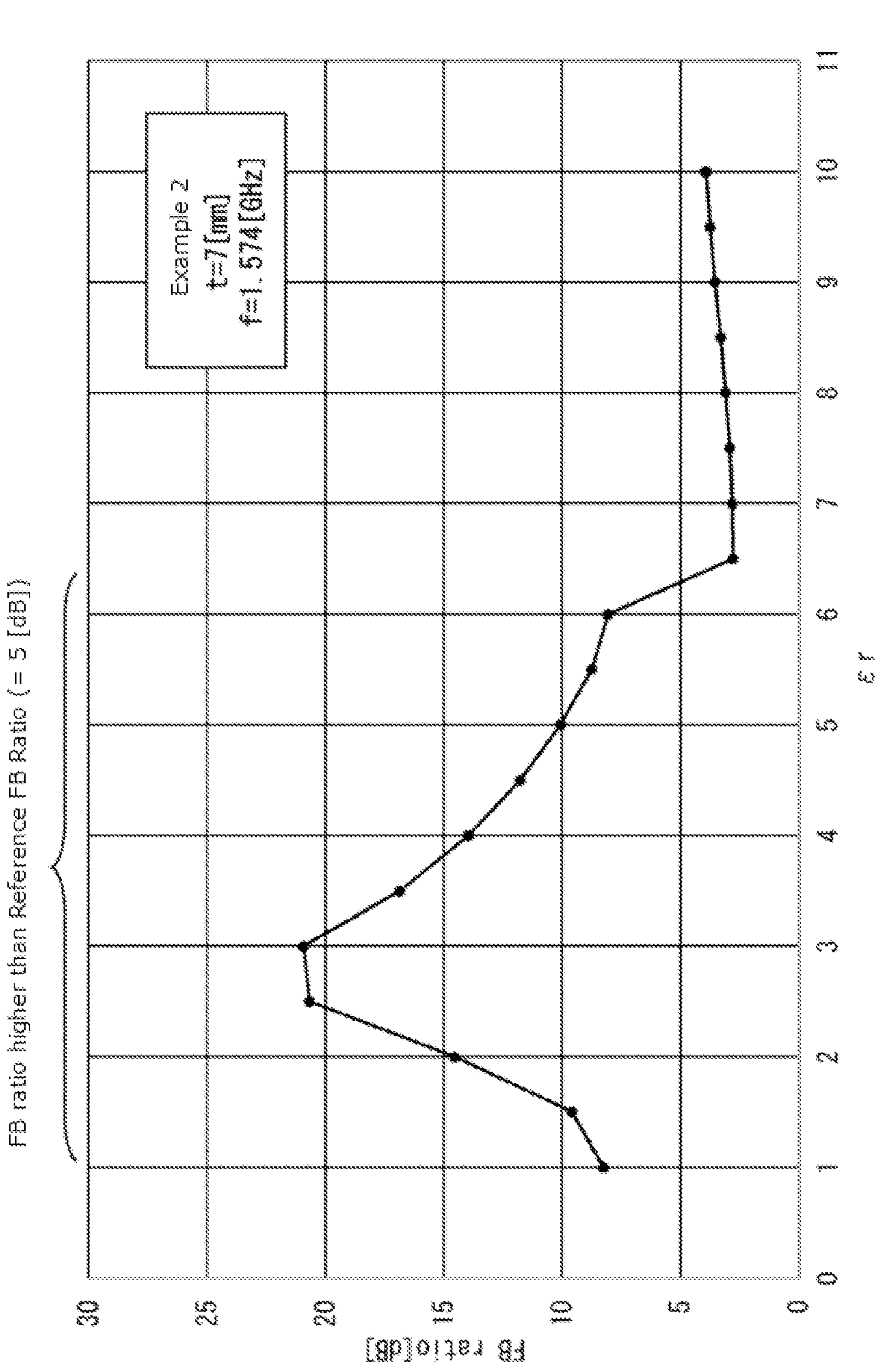
FIG. 7 is a graph showing the relationship between the relative permittivity of the dielectric layer and the FB ratio.

FIG. 7 is used to show the relationship between the relative permittivity $\varepsilon_r$ of the dielectric layer 60 and the FB ratio at a dielectric layer 60 thickness t of 7 mm. FIG. 7 is a graph showing the relationship between the relative permittivity of the dielectric layer and the FB ratio.

As shown in FIG. 7, at a dielectric layer 60 thickness t of 7 mm, the FB ratio of the vehicle antenna system 200 was higher than the reference FB ratio in the relative permittivity $\varepsilon_r$ range of 1 to 6.1. At each relative permittivity with a higher FB ratio, Equation (1) was found to be satisfied when calculated using a thickness t of 7 mm and a frequency f of 1574 MHz.

Figure 8:
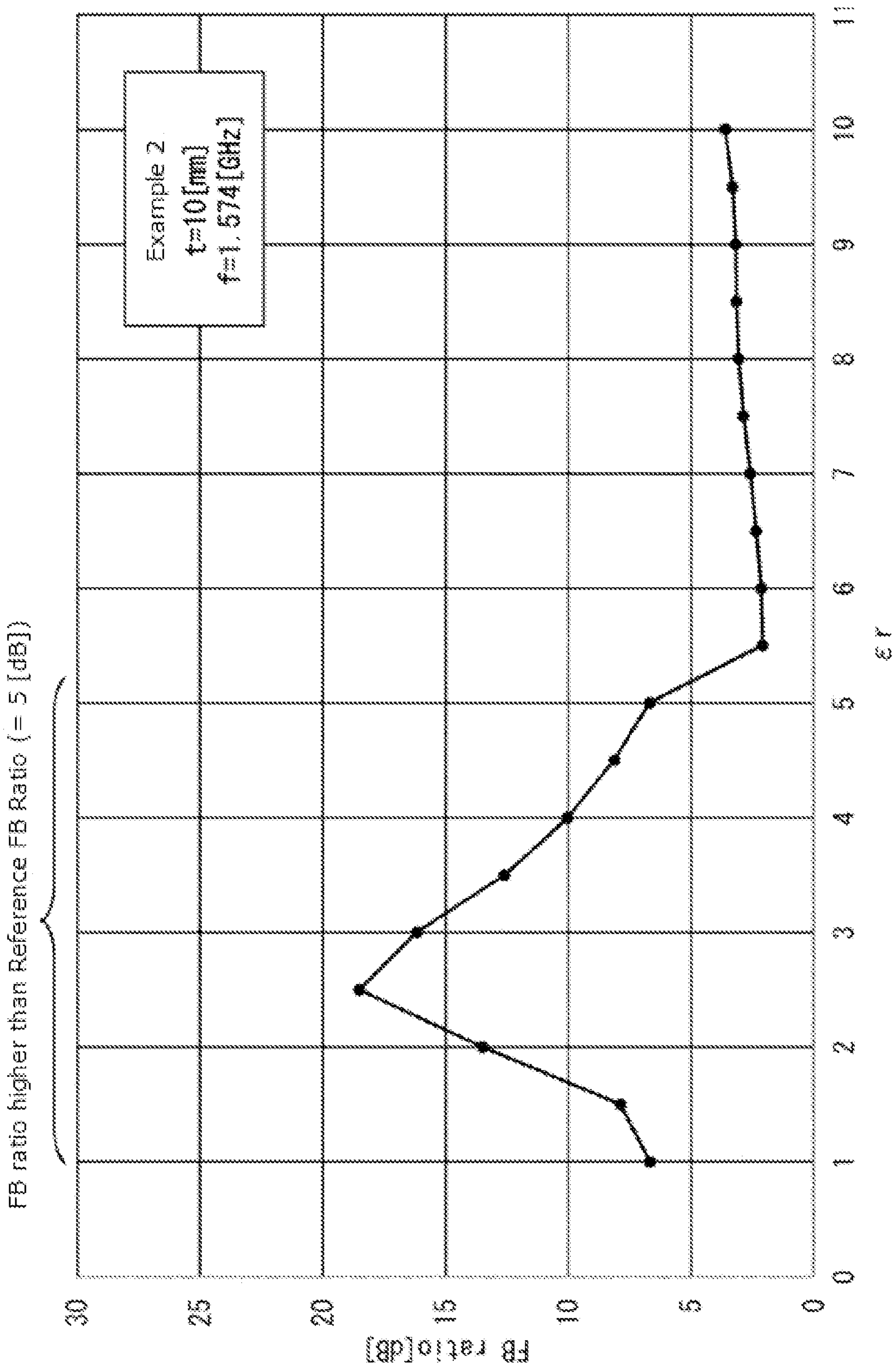
FIG. 8 is a graph showing the relationship between the relative permittivity of the dielectric layer and the FB ratio.

FIG. 8 is used to show the relationship between the relative permittivity $\varepsilon_r$ of the dielectric layer 60 and the FB ratio at a dielectric layer 60 thickness t of 10 mm. FIG. 8 is a graph showing the relationship between the relative permittivity of the dielectric layer and the FB ratio.

As shown in FIG. 8, at a dielectric layer 60 thickness t of 10 mm, the FB ratio of the vehicle antenna system 200 was higher than the reference FB ratio in the relative permittivity $\varepsilon_r$ range of 1 to 5.1. At each relative permittivity with a higher FB ratio, Equation (1) was found to be satisfied when calculated using a thickness t of 10 mm and a frequency f of 1574 MHZ.

Figure 9:
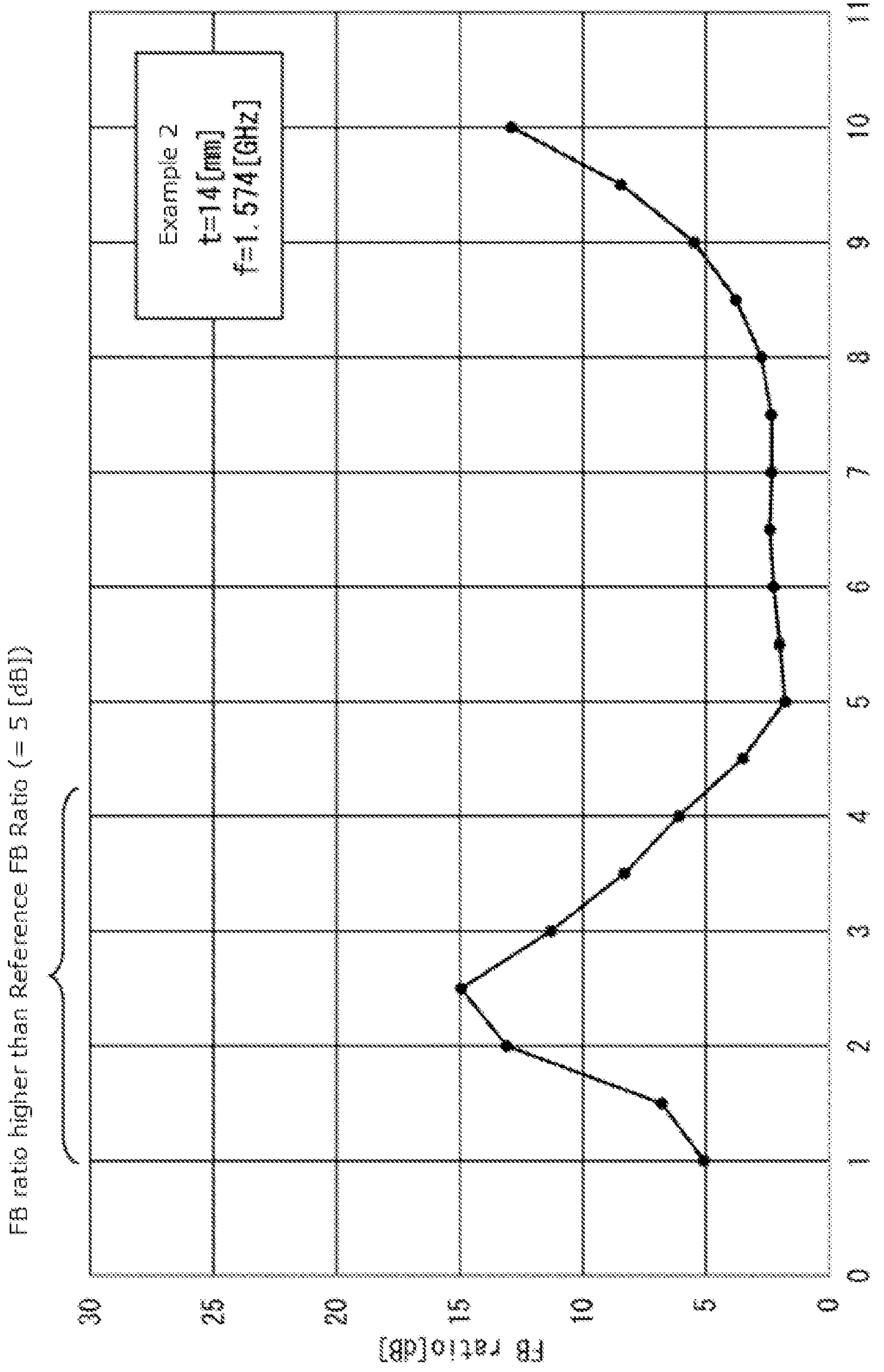
FIG. 9 is a graph showing the relationship between the relative permittivity of the dielectric layer and the FB ratio.

FIG. 9 is used to show the relationship between the relative permittivity $\varepsilon_r$ of the dielectric layer 60 and the FB ratio at a dielectric layer 60 thickness t of 14 mm. FIG. 9 is a graph showing the relationship between the relative permittivity of the dielectric layer and the FB ratio.

As shown in FIG. 9, at a dielectric layer 60 thickness t of 14 mm, the FB ratio of the vehicle antenna system 200 was higher than the reference FB ratio in the relative permittivity $\varepsilon_r$ range of 1 to 4.1. At each relative permittivity with a higher FB ratio, Equation (1) was found to be satisfied when calculated using a thickness t of 14 mm and a frequency f of 1574 MHz.

This confirmed that the vehicle antenna system 200 according Example 2 can raise the FB ratio above the reference FB ratio when the frequency of the signals received by the radiating conductor 41, the relative permittivity of the dielectric layer 60, and the thicknesses t of the dielectric layer 60 at 2 mm, 4 mm, 7 mm, 10 mm, and 14 mm satisfy Equation (1). In other words, the vehicle antenna system 200 according to Example 2 can realize high reception performance and thus efficiently receive circularly polarized signals from the zenith direction, such as GNSS signals. The thickness t of the dielectric layer 60 may be 2 mm or less, or 14 mm or more. As mentioned above, the thickness t of the dielectric layer 60 may be 0.5 mm or more, 1.0 mm or more, or 1.5 mm or more. In addition, the thickness t of the dielectric layer 60 may be 16 mm or less or 15 mm or less.

Example 3

Figure 10:
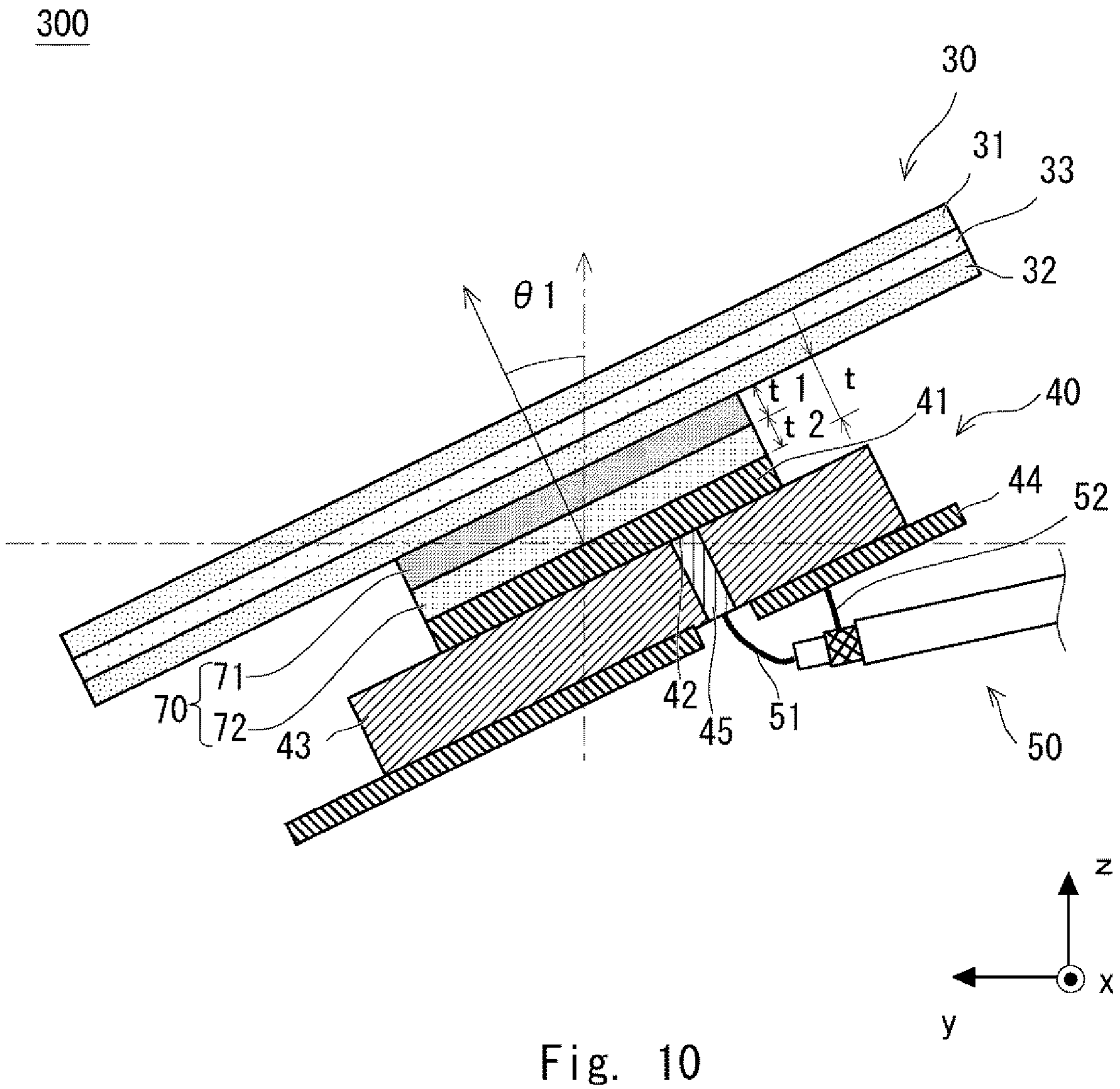
FIG. 10 is a diagram showing a configuration of the vehicle antenna system according to Example 3.

Next, FIG. 10 is used to explain a configuration of the vehicle antenna system 300 according to Example 3. FIG. 10 shows a configuration of a vehicle antenna system 300 according to Example 3, in which the dielectric layer 60 in the vehicle antenna system 200 according to Example 2 is replaced by dielectric layers 70. Specifically, in Example 2, the dielectric layer 60 was composed of a single dielectric layer, but in Example 3, the dielectric layers 70 are composed of a plurality of dielectric layers. The configurations of the window glass 30, the antenna element 40, and the coaxial cable 50 are the same as those in Example 2, so further description has been omitted.

The dielectric layers 70 include a first dielectric layer 71 and a second dielectric layer 72. The first dielectric layer 71 can be, for example, an air layer adjacent to the inner surface of the window glass 30. The second dielectric layer 72 is a non-air layer adjacent to the first dielectric layer 71. The dielectric layer 70 can also be a combination of a first dielectric layer 71 that is a non-air layer and a second dielectric layer that is an air layer. In addition, the dielectric layers 70 may be a combination of a first dielectric layer 71 that is a first non-air layer and a second dielectric layer 72 that is a second non-air layer. In this case, the relative permittivity of the first non-air layer is different from that of the second non-air layer. As in Example 2, the vehicle antenna system 300 according to Example 3 may satisfy a dielectric layer 70 thickness t [mm] of 0.5 mm to 16 mm. Also, as in Example 2, the vehicle antenna system 200 according to Example 3 has a dielectric layer 70 thickness t [mm] of 0.5 mm to 16 mm. When the frequency of the signals received by the radiating conductor 41 is f [MHz], the relative permittivity $\varepsilon_r$ of the dielectric layers 70 may satisfy Equation (1) above.

The relative permittivity $\varepsilon_r$ of the dielectric layers 70 can be calculated using Equation (2) using the relative permittivity $\varepsilon_1$ and thickness $t_1$ [mm] of the first dielectric layer 71 and the relative permittivity $\varepsilon_2$ and thickness $t_2$ [mm] of the second dielectric layer 72. In other words, the relative permittivity $\varepsilon_r$ of the dielectric layers 70 can be calculated from the relative permittivity $\varepsilon_r$ in Equation (2) according to the ratio of the thickness of the first dielectric layer 71 and the second dielectric layer 72 among the thicknesses of the dielectric layers 70. In other words, the thickness and relative permittivity of the dielectric layers 70 in the vehicle antenna system 300 according to Example 3 may be set using Equation (1) and Equation (2) so that the thickness t [mm] of the dielectric layers 70 is 0.5 mm to 16 mm and satisfies Equation (1).

Equation 2

$$\epsilon_r = \epsilon_1 \times \frac{t_1}{t} + \epsilon_2 \times \frac{t_2}{t} \tag{2}$$

In an example in which the vehicle antenna system 300 has two dielectric layers (a first dielectric layer 71 and a second dielectric layer), Equation (2) is used to calculate the thickness and relative permittivity of the dielectric layers 70, which can be generalized and expressed as follows. When the vehicle antenna system has M dielectric layers (where M is an integer greater than or equal to 1), the thickness and relative permittivity of the dielectric layers 70 may be set so that the thickness t [mm] of the dielectric layers 70 is 0.5 mm to 16 mm and Equation (3) is satisfied. In Equation (3), $\varepsilon_j$ is the jth relative permittivity, $t_j$ is the thickness of the jth dielectric layer, and t is the total thickness of the dielectric layers.

Equation 3

$$\epsilon_r = \sum_{j=1}^{M} \epsilon_j \times \frac{t_j}{t} \tag{3}$$

As mentioned above, in the vehicle antenna system 300 according to Example 3, the dielectric layer 60 according to Example 2 has been replaced by dielectric layers 70, but Equation (1) and Equation (2) can be used to achieve a configuration similar to the vehicle antenna system 200 according to Example 2. Also, when the vehicle antenna system 300 according to Example 3 has three or more dielectric layers 70, Equation (1) and Equation (3) can be used to achieve a configuration similar to the vehicle antenna system 200 according to Example 2. Therefore, the vehicle antenna system 300 according to Example 3, like the vehicle antenna system 200 according to Example 2, realizes a high FB ratio and excellent reception performance, and circularly polarized signals from the zenith direction such as GNSS signals can be received efficiently. Note that while the vehicle antenna system 300 according to Example 3 was described using the vehicle antenna system 200 according to Example 2, the dielectric layer 60 in the vehicle antenna system 100 according Example 1 may be replaced by dielectric layers 70.

Second Embodiment

A second embodiment will now be described. In the first embodiment, the antenna element 40 was configured with one radiating conductor 41. In the second embodiment, the antenna element is configured with two radiating conductors.

Example 4

Figure 11:
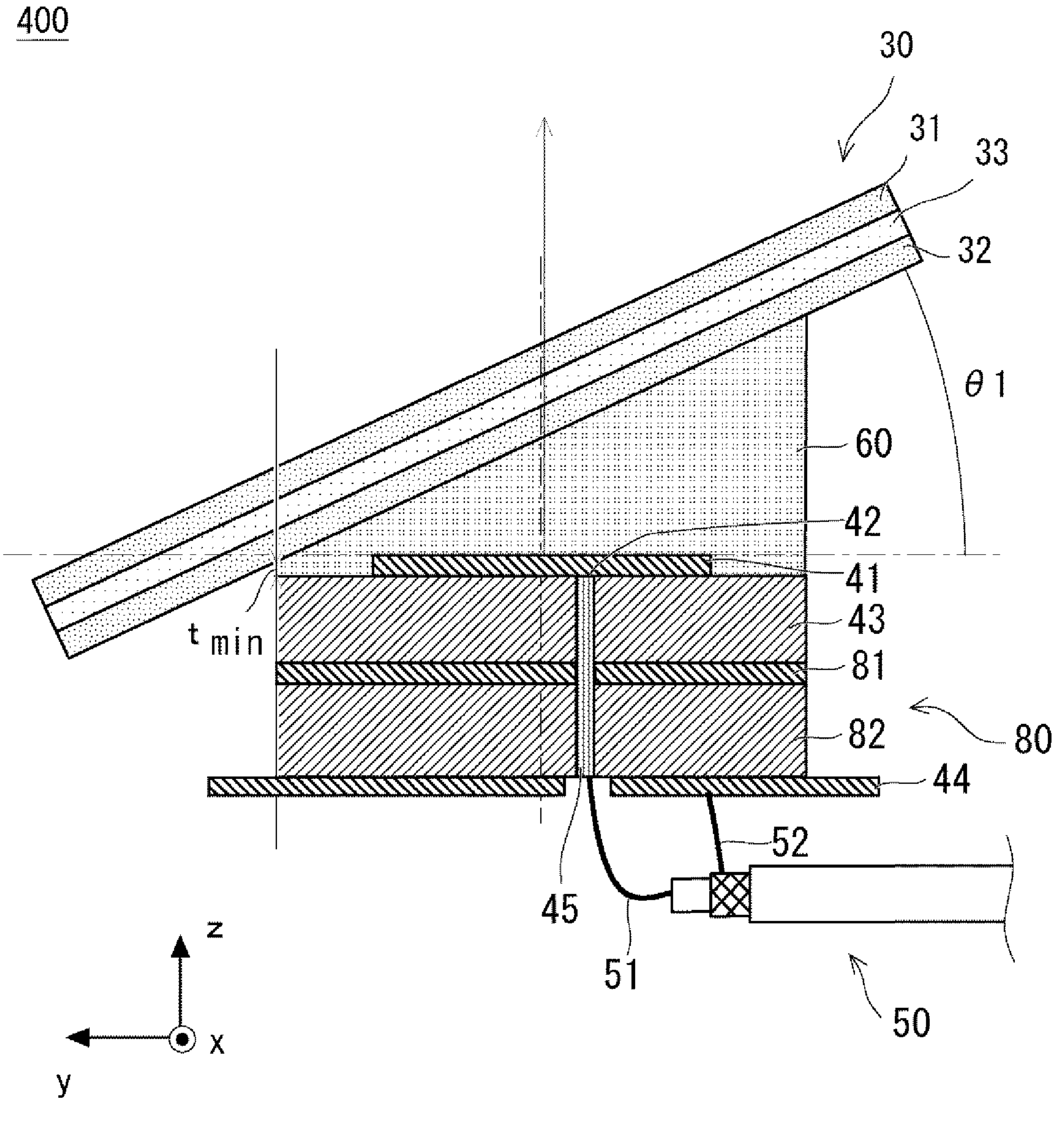
FIG. 11 is an enlarged cross-sectional view cut along cut line A-A.

FIG. 11 is used to explain a configuration of the vehicle antenna system 400 according to Example 4. FIG. 11 corresponds to FIG. 3 and is an enlarged cross-sectional view cut away at cut line A-A in FIG. 1. Here, the cross-section is orthogonal to the horizontal plane.

As shown in FIG. 11, the vehicle antenna system 400 according to Example 4 has window glass 30, an antenna element 80, a coaxial cable 50, and a dielectric layer 60.

In the vehicle antenna system 400 of the second embodiment (Example 4), the antenna element 40 in the vehicle antenna system 100 of the first embodiment (Example 1) has been replaced by antenna element 80. In the description of the present embodiment, the window glass 30 is a windshield. The window glass 30, coaxial cable 50, and dielectric layer 60 each basically have the same configuration as in the first embodiment, so further description of these components has been omitted. Description of portions of antenna element 80 shared by antenna element 40 has also been omitted.

Antenna element 80 has radiating conductor 41 and radiating conductor 81, dielectric substrate 43 and dielectric substrate 82, a grounding conductor 44, and a conductor 45. In other words, the antenna element 80 consists of two radiating conductors and two dielectric substrates. Radiating conductor 41 is also referred to as the first radiating conductor, and radiating conductor 81 is also referred to as the second radiating conductor. Dielectric substrate 43 is also referred to as the first dielectric substrate, and dielectric substrate 82 is also referred to as the second dielectric substrate.

Radiating conductor 41 is a radiating conductor that is able to receive GNSS signals in the 1.6 GHz band, as in the first embodiment. Radiating conductor 41 is positioned non-parallel to the inner surface of the window glass 30. The window glass 30 is positioned at angle θ1 to the horizontal plane, and angle θ1 may be, for example, 20° to 25°. Radiating conductor 41 may be positioned so that the antenna element 80 is at an angle of 20 to 25° relative to the inner surface of the window glass 30. In other words, the antenna element 80 may be arranged so that the normal direction of radiating conductor 41 is identical to the zenith direction.

Radiating conductor 41 is provided on the first principal plane of dielectric substrate 43. Radiating conductor 81 is provided on the second principal plane of dielectric substrate 43. In other words, radiating conductor 81 is positioned opposite radiating conductor 41 via dielectric substrate 43.

Radiating conductor 81 is able to receive circularly polarized signals of a frequency lower than that received by radiating conductor 41, and is capable of receiving GNSS signals in the 1.2 GHz band. In the antenna element 80, radiating conductor 81 is positioned parallel to radiating conductor 41. Therefore, in this case, radiating conductor 81 is positioned at an angle of 20° to 25° to the inner surface of the window glass 30. Radiating conductor 81 is connected to the conductor 45 at a position corresponding to the power supply point 42 of radiating conductor 41. Radiating conductor 81 is connected to and supplied power by a signal line 51 in the coaxial cable 50 via the conductor 45.

Dielectric substrate 82 may be, for example, a substrate made of a ceramic. Radiating conductor 81 is provided on the third principal plane of dielectric substrate 82, which is the principal plane on the window glass 30 side. The grounding conductor 44 is provided on the fourth principal plane, which is opposite the third principal plane of dielectric substrate 82. Dielectric substrate 82 is provided with the conductor 45 in the thickness direction corresponding to the power supply point 42 in dielectric substrate 43.

The grounding conductor 44 forms a ground plane on the fourth principal plane of dielectric substrate 82. In other words, the grounding conductor 44 is positioned opposite radiating conductor 41 and radiating conductor 81 via dielectric substrate 82.

The dielectric layer 60 may include an air layer or a non-air layer, as in the first embodiment. When the antenna element 80 is positioned with radiating conductor 41 at an angle of 20° to 25° to the window glass 30, as in Example 4, the minimum thickness $t_{min}$ [mm] of the dielectric layer 60 may satisfy 0.5 mm to 16 mm. In this case, the minimum thickness $t_{min}$ [mm] of the dielectric layer 60 may satisfy 0.7 mm to 16 mm or 1 mm to 16 mm. As shown in FIG. 4, the minimum thickness $t_{min}$ [mm] of the dielectric layer 60 is the distance between the end of the dielectric substrate 43 that is closest to the window glass 30 and the window glass 30 itself. When the minimum thickness $t_{min}$ [mm] of the dielectric layer 60 is 0.5 mm to 16 mm, the relative permittivity $\varepsilon_r$ of the dielectric layer 60 may satisfy Equation (4) below.

Equation 4

$$1 \leqq \varepsilon_r \leqq 7.11882 \times t_{min}^{-0.385302} \tag{4}$$

In other words, the minimum thickness and relative permittivity of the dielectric layer 60 in the vehicle antenna system 400 according Example 4 may be set so that the minimum thickness $t_{min}$ [mm] of the dielectric layer 60 satisfies 0.5 mm to 16 mm, and so that Equation (4) is satisfied.

The reception performance of the vehicle antenna system 400 according to Example 4 will now be described. In Example 4, as in Example 2, the FB ratio of the antenna element 80 was evaluated by simulation. In Example 4, the FB ratio [dB] was calculated after varying the minimum thickness $t_{min}$ [mm] of the dielectric layer 60, and the relative permittivity $\varepsilon_r$ of the dielectric layer 60. If higher than the reference FB ratio, the reception performance of the vehicle antenna system 400 was rated as higher than the reception performance in the reference state. The FB ratio in the reference state in which the antenna element 80 is not attached to the window glass 30 was 5 [dB] for radiating conductor 41 and 3 [dB] for radiating conductor 81. Therefore, the reference FB ratios for radiating conductor 41 and radiating conductor 81 were set to 5 [dB] and 3 [dB], respectively. The evaluation indicated that when the FB ratios are higher than both reference FB ratios, the reception performance of the vehicle antenna system 400 is higher than the reception performance in the reference state.

In order to evaluate the FB ratio of the vehicle antenna system 400 according to Example 4, the simulation conditions were set as follows. The dielectric substrates 43, 82 are ceramic materials.

Frequency f1 [MHz] of signals received by radiating conductor 41: 1575 [MHz] (=1.575 [GHz])

Frequency f2 [MHz] of signal received by radiating conductor 81: 1228 [MHz] (=1.228 [GHz])

Size of radiating conductor 41 in antenna element 80: 20 [mm]×20 [mm]

Size of radiating conductor 83 in antenna element 80: 26 [mm]×26 [mm]

Size of grounding conductor 44: 70 [mm]×70 [mm]

Thickness of dielectric substrate 43 in antenna element 80: 3 [mm]

Thickness of dielectric substrate 82 in antenna element 80: 3 [mm]

Size of window glass 30 on which antenna element 80 is located: 200 [mm]×200 [mm]

Angle (θ1) between window glass 30 and radiating conductors 41, 81: 23°

Figure 12:
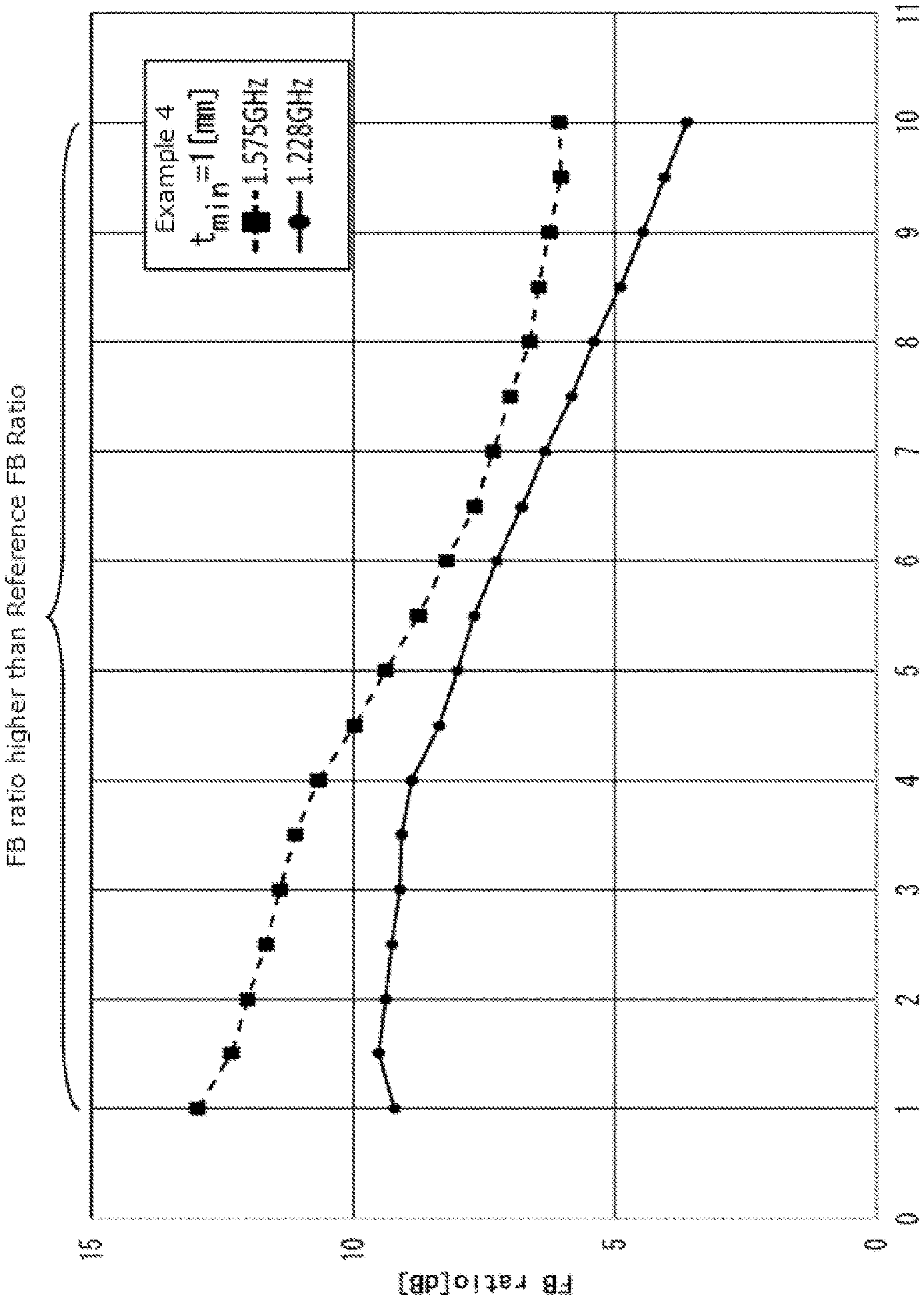
FIG. 12 is a graph showing the relationship between the relative permittivity of the dielectric layer and the FB ratio.

First, FIG. 12 is used to show the relationship between the relative permittivity $\varepsilon_r$ of the dielectric layer 60 and the FB ratio at a minimum thickness $t_{min}$ for the dielectric layer 60 of 1 mm. In FIG. 12, the dotted line indicates the FB ratio of radiating conductor 41 and the solid line indicates the FB ratio of radiating conductor 81. In FIG. 12 and subsequent figures, which show the relationship between the relative permittivity $\varepsilon_r$ of the dielectric layer 60 and the FB ratio [dB], the dotted line indicates the FB ratio of radiating conductor 41 and the solid line indicates the FB ratio of radiating conductor 81.

As shown in FIG. 12, when the minimum thickness $t_{min}$ of the dielectric layer 60 was 1 mm, the FB ratios of the radiating conductors 41, 81 in the vehicle antenna system 400 were higher than the reference FB ratio in the relative permittivity εr range of 1 to 10. At each relative permittivity with a higher FB ratio, Equation (4) was satisfied when calculated using a minimum thickness $t_{min}$ for the dielectric layer 60 of 1 mm.

Figure 13:
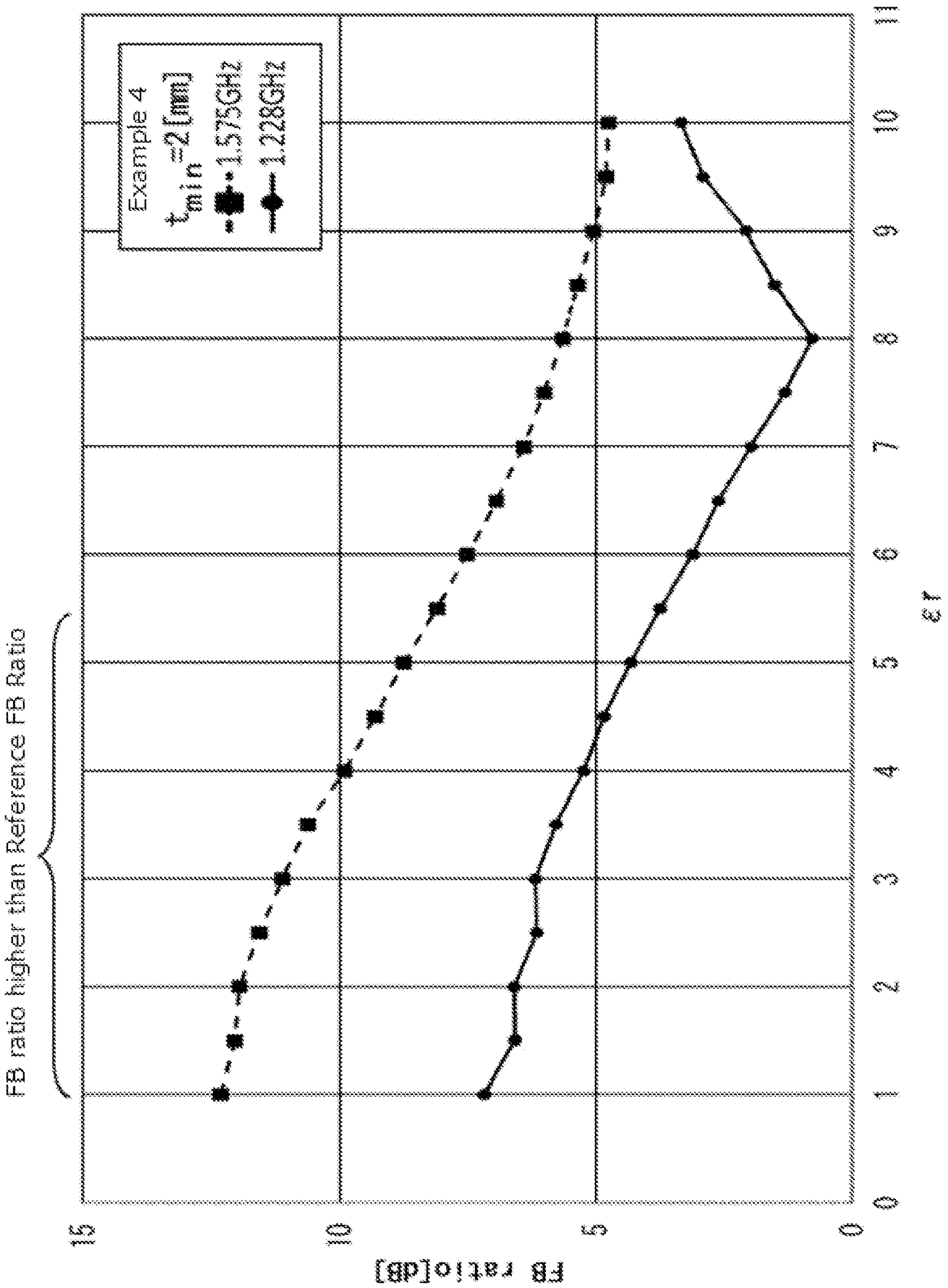
FIG. 13 is a graph showing the relationship between the relative permittivity of the dielectric layer and the FB ratio.

Next, FIG. 13 is used to show the relationship between the relative permittivity $\varepsilon_r$ of the dielectric layer 60 and the FB ratio [dB] at a dielectric layer 60 minimum thickness $t_{min}$ Of 2 mm. FIG. 13 is a graph showing the relationship between the relative permittivity of the dielectric layer and the FB ratio.

As shown in FIG. 13, when the minimum thickness $t_{min}$ of the dielectric layer 60 was 2 mm, the FB ratios of the radiating conductors 41, 81 in the vehicle antenna system 400 were higher than the reference FB ratio in the relative permittivity $\varepsilon_r$ range of 1 to 5.4. At each relative permittivity with a higher FB ratio, Equation (4) was satisfied when calculated using a minimum thickness $t_{min}$ for the dielectric layer 60 of 2 mm.

Figure 14:
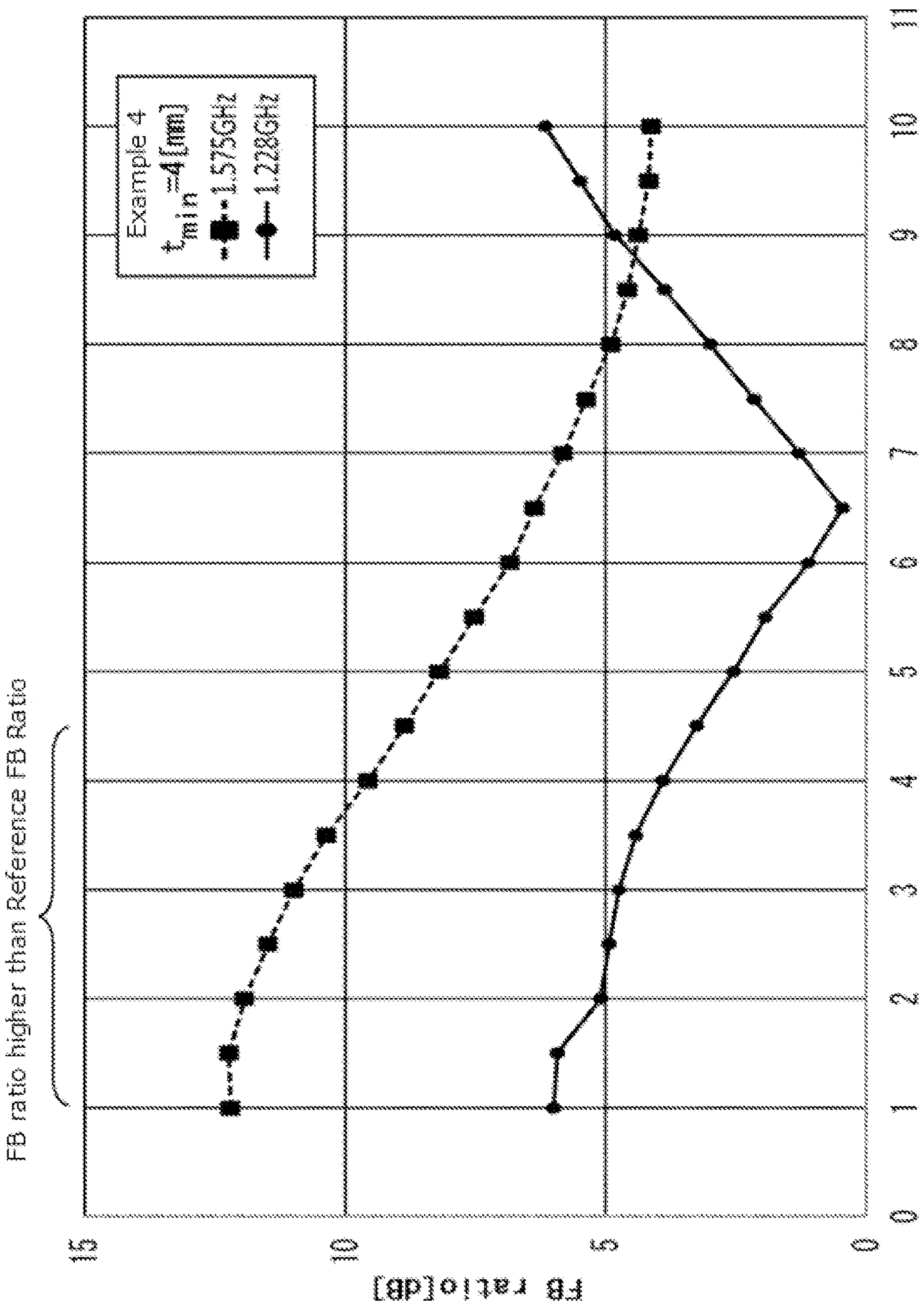
FIG. 14 is a graph showing the relationship between the relative permittivity of the dielectric layer and the FB ratio.

Next, FIG. 14 is used to show the relationship between the relative permittivity εr of the dielectric layer 60 and the FB ratio [dB] at a dielectric layer 60 minimum thickness $t_{min}$ of 4 mm. FIG. 14 is a graph showing the relationship between the relative permittivity of the dielectric layer and the FB ratio.

As shown in FIG. 14, when the minimum thickness $t_{min}$ of the dielectric layer 60 was 4 mm, the FB ratios of the radiating conductors 41, 81 in the vehicle antenna system 400 were higher than the reference FB ratio in the relative permittivity $\varepsilon_r$ range of 1 to 4.1. At each relative permittivity with a higher FB ratio, Equation (4) was satisfied when calculated using a minimum thickness $t_{min}$ for the dielectric layer 60 of 4 mm.

Figure 15:
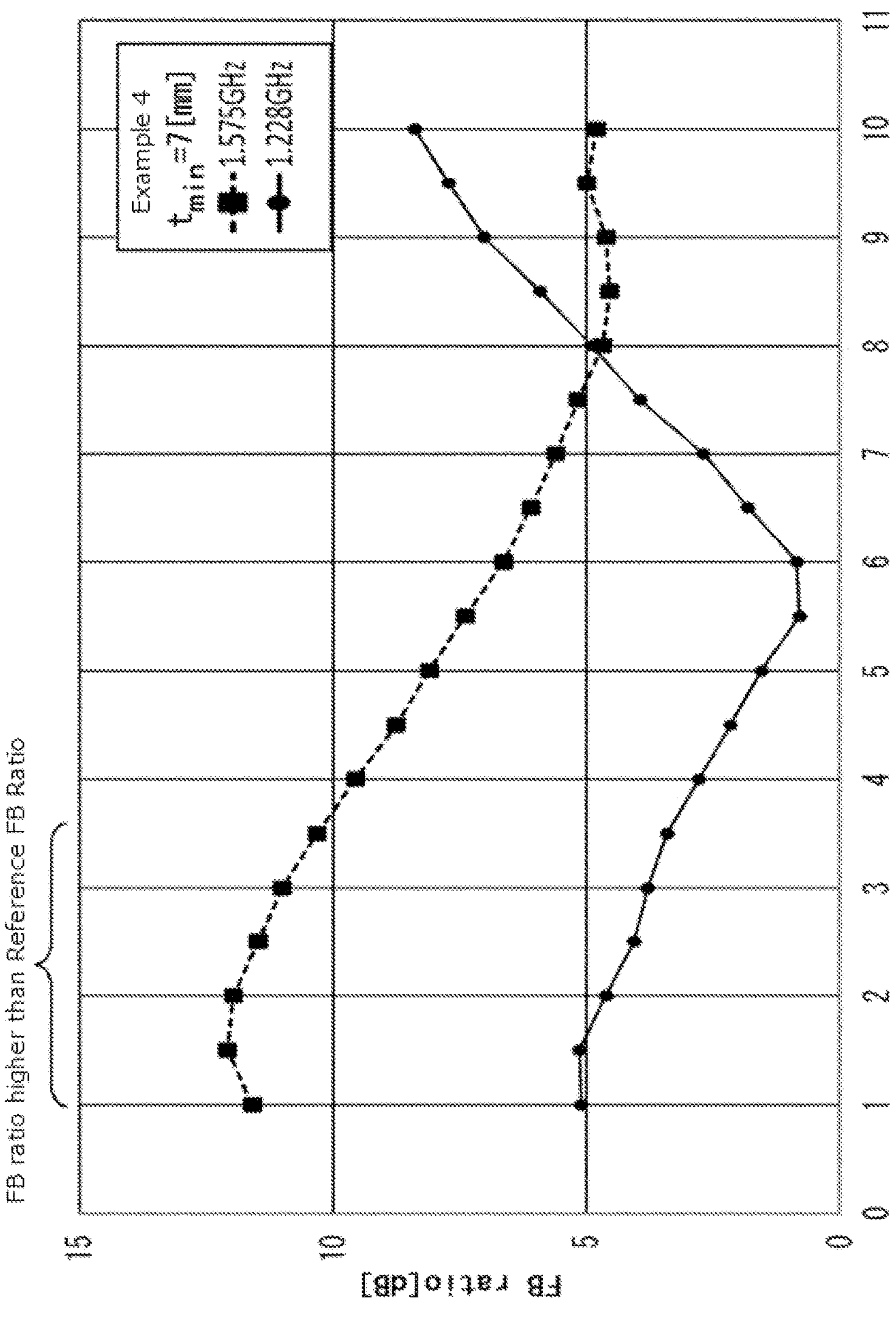
FIG. 15 is a graph showing the relationship between the relative permittivity of the dielectric layer and the FB ratio.

Next, FIG. 15 is used to show the relationship between the relative permittivity εr of the dielectric layer 60 and the FB ratio [dB] at a dielectric layer 60 minimum thickness $t_{min}$ of 7 mm. FIG. 15 is a graph showing the relationship between the relative permittivity of the dielectric layer and the FB ratio.

As shown in FIG. 15, at a minimum thickness $t_{min}$ for the dielectric layer 60 of 7 mm, the FB ratios of the radiating conductors 41, 81 in the vehicle antenna system 400 were higher than the reference FB ratio in the relative permittivity $\varepsilon_r$ range of 1 to 3.3. At each relative permittivity with a higher FB ratio, Equation (4) was satisfied when calculated using a minimum thickness $t_{min}$ for the dielectric layer 60 of 7 mm.

Figure 16:
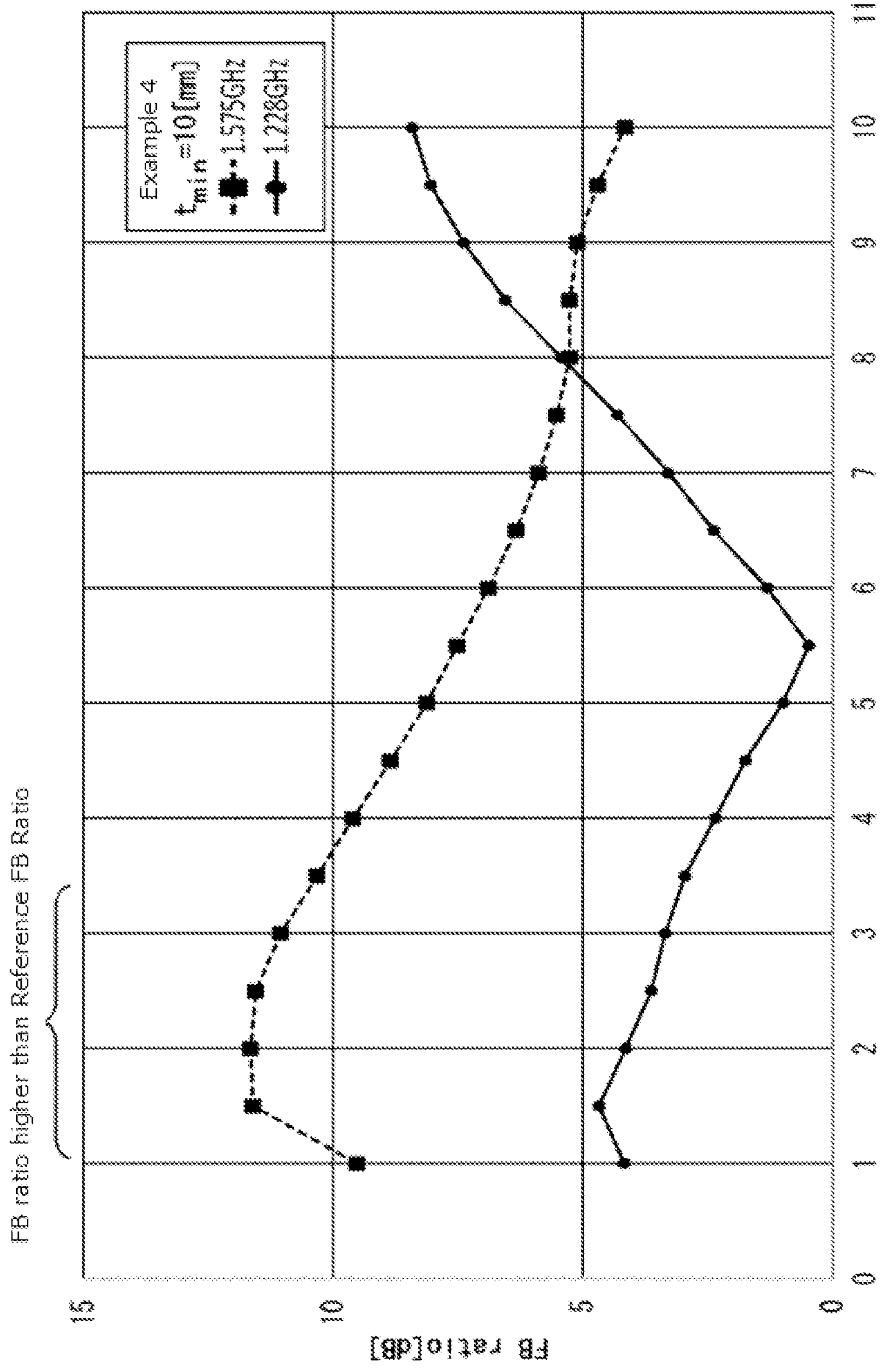
FIG. 16 is a graph showing the relationship between the relative permittivity of the dielectric layer and the FB ratio.

Next, FIG. 16 is used to show the relationship between the relative permittivity $\varepsilon_r$ of the dielectric layer 60 and the FB ratio [dB] at a dielectric layer 60 minimum thickness $t_{min}$ of 10 mm. FIG. 16 is a graph showing the relationship between the relative permittivity of the dielectric layer and the FB ratio.

As shown in FIG. 16, when the minimum thickness $t_{min}$ of the dielectric layer 60 was 10 mm, the FB ratios of the radiating conductors 41, 81 in the vehicle antenna system 400 were higher than the reference FB ratio in the relative permittivity $\varepsilon_r$ range of 1 to 2.9. At each relative permittivity with a higher FB ratio, Equation (4) was satisfied when calculated using a minimum thickness $t_{min}$ for the dielectric layer 60 of 10 mm.

Figure 17:
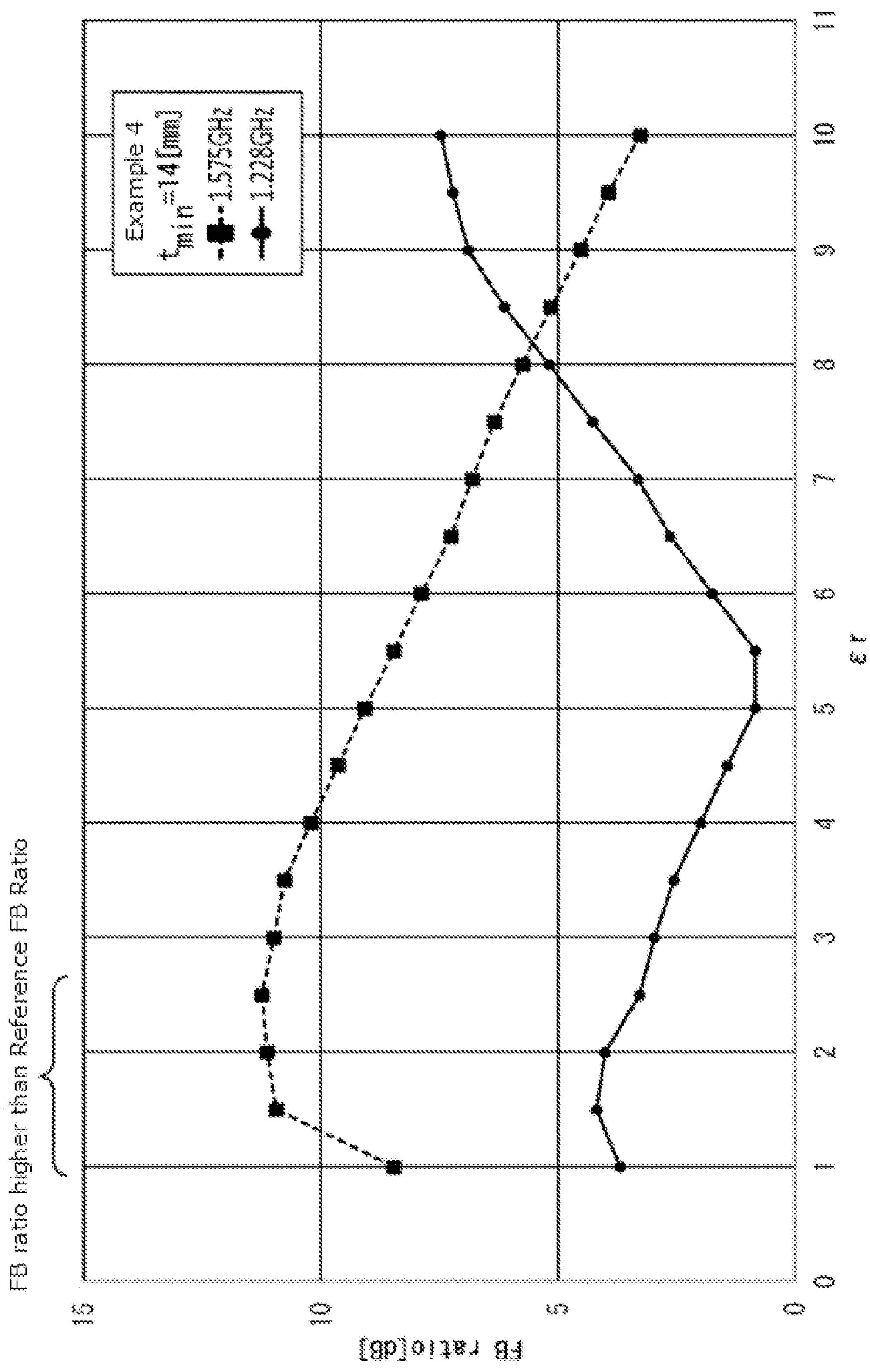
FIG. 17 is a graph showing the relationship between the relative permittivity of the dielectric layer and the FB ratio.

Next, FIG. 17 is used to show the relationship between the relative permittivity εr of the dielectric layer 60 and the FB ratio [dB] at a dielectric layer 60 minimum thickness $t_{min}$ of 14 mm. FIG. 17 is a graph showing the relationship between the relative permittivity of the dielectric layer and the FB ratio.

As shown in FIG. 17, when the minimum thickness $t_{min}$ of the dielectric layer 60 was 14 mm, the FB ratios of the radiating conductors 41, 81 in the vehicle antenna system 400 were higher than the reference FB ratio in the relative permittivity $\varepsilon_r$ range of 1 to 2.5. At each relative permittivity with a higher FB ratio, Equation (4) was satisfied when calculated using a minimum thickness $t_{min}$ for the dielectric layer 60 of 14 mm.

As described above, the vehicle antenna system 400 according Example 4 can raise the FB ratio higher than the reference FB ratio when the relative permittivity at a dielectric layer 60 minimum thickness $t_{min}$ of 1 mm, 2 mm, 4 mm, 7 mm, 10 mm, and 14 mm satisfies Equation (4). In other words, the vehicle antenna system 400 according to Example 4 can realize high reception performance and thus efficiently receive circularly polarized signals from the zenith direction, such as GNSS signals. Note that the minimum thickness $t_{min}$ of the dielectric layer 60 may be 0.5 mm or more, 0.7 mm or more, 16 mm or less, or 15 mm or less. Although angle θ1 was 23° in this example, angle θ1 can be higher than the standard FB ratio while still satisfying Equation (4) as long as the angle is at least in the range of 20° to 25°.

Example 5

Figure 18:
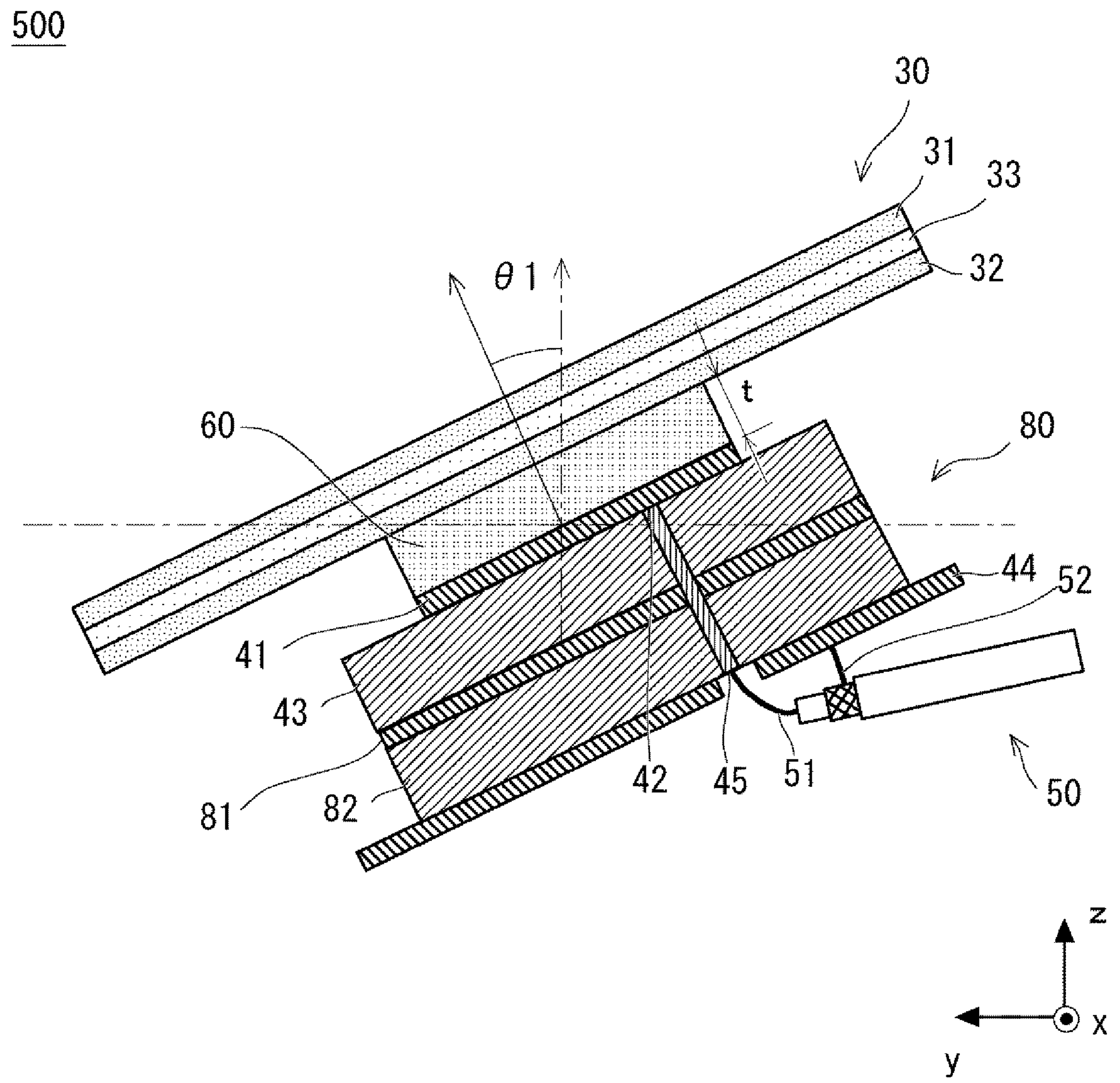
FIG. 18 is a diagram showing a configuration of the vehicle antenna system according to Example 5.

Example 5 will now be described. Example 5 is a vehicle antenna system 500 in which the radiating conductors 41, 81 are positioned parallel to the inner surface of the window glass 30. FIG. 18 will be used to explain a configuration of the vehicle antenna system 500 according to Example 5. FIG. 18 corresponds to FIG. 11 and is an enlarged cross-sectional view cut away at cut line A-A in FIG. 1. Here, the cross-section is orthogonal to the horizontal plane. Because the configurations of the window glass 30, antenna element 80, coaxial cable 50, and dielectric layer 60 are the same as those in Example 4, further description of these configurations has been omitted.

The radiating conductor 41 is positioned parallel to the inner surface of the window glass 30. The radiating conductor 41 is arranged so that the antenna element 80 is at an angle of θ1 (20° to 25°) relative to the horizontal plane. As shown in FIG. 18, the angle formed by the normal direction of the first principal plane of the dielectric substrate 43 and the vertical direction is the same as angle θ1.

When the radiating conductor 41 is positioned parallel to the inner surface of the window glass 30, the thickness t [mm] of the dielectric layer 60 may be 0.5 mm to 16 mm. When the thickness t [mm] of the dielectric layer 60 is 0.5 mm to 16 mm and the frequency of the signals received by the radiating conductor 41 is f1 [MHz], the relative permittivity $\varepsilon_r$ of the dielectric layer 60 may be set to satisfy Equation (5) below.

Equation 5

$$1 \leqq \varepsilon_r \leqq (-0.00197869 \times f1^2 + 6.18143 \times f1 + 4817.72) \times t^{(0.0001538 \times f1 \times f1 - 0.317206 \times f1 + 247.206)} \quad (5)$$

In other words, the vehicle antenna system 500 according to Example 5 may have the thickness and relative permittivity of the dielectric layer 60 set so that the thickness t [mm] of the dielectric layer 60 is 0.5 mm to 16 mm and Equation (5) is also satisfied. Note that the frequency f2 of the signals received by the radiating conductor 81 is not used in Equation (5). This is because the frequency bandwidth of the 1.2 GHz band, which includes frequency f2, is narrower than the 1.6 GHz band, which includes the frequency f1, and even when frequency f2 is changed, the effect on the relative permittivity $\varepsilon_r$ is small.

The reception performance of the vehicle antenna system 500 according to Example 5 will now be described. In Example 5, as in Example 4, the FB ratio of the antenna element 80 was evaluated by simulation. In Example 5, the FB ratio [dB] was calculated after varying the minimum thickness $t_{min}$ [mm] of the dielectric layer 60, and the relative permittivity $\varepsilon_r$ of the dielectric layer 60. If higher than the reference FB ratio, the reception performance was rated as high. Note that the reference FB ratio was set to 5 [dB] for radiating conductor 41 and to 3 [dB] for radiating conductor 81, as in Example 4.

In order to evaluate the FB ratio of the vehicle antenna system 500 according to Example 5, the simulation conditions were set as follows.

Frequency f1 [MHz] of signals received by radiating conductor 41: 1575 [MHz] (=1.575 [GHz])

Frequency f2 [MHz] of signals received by radiating conductor 81: 1228 [MHz] (=1.228 [GHz])

Size of radiating conductor 41 in antenna element 80: 20 [mm]×20 [mm]

Size of radiating conductor 83 in antenna element 80: 26 [mm]×26 [mm]

Size of grounding conductor 44: 70 [mm]×70 [mm]

Thickness of dielectric substrate 43 in antenna element 80: 3 [mm]

Thickness of dielectric substrate 82 in antenna element 80: 3 [mm]

Size of window glass 30 on which antenna element 80 is located: 200 [mm]×200 [mm]

Figure 19:
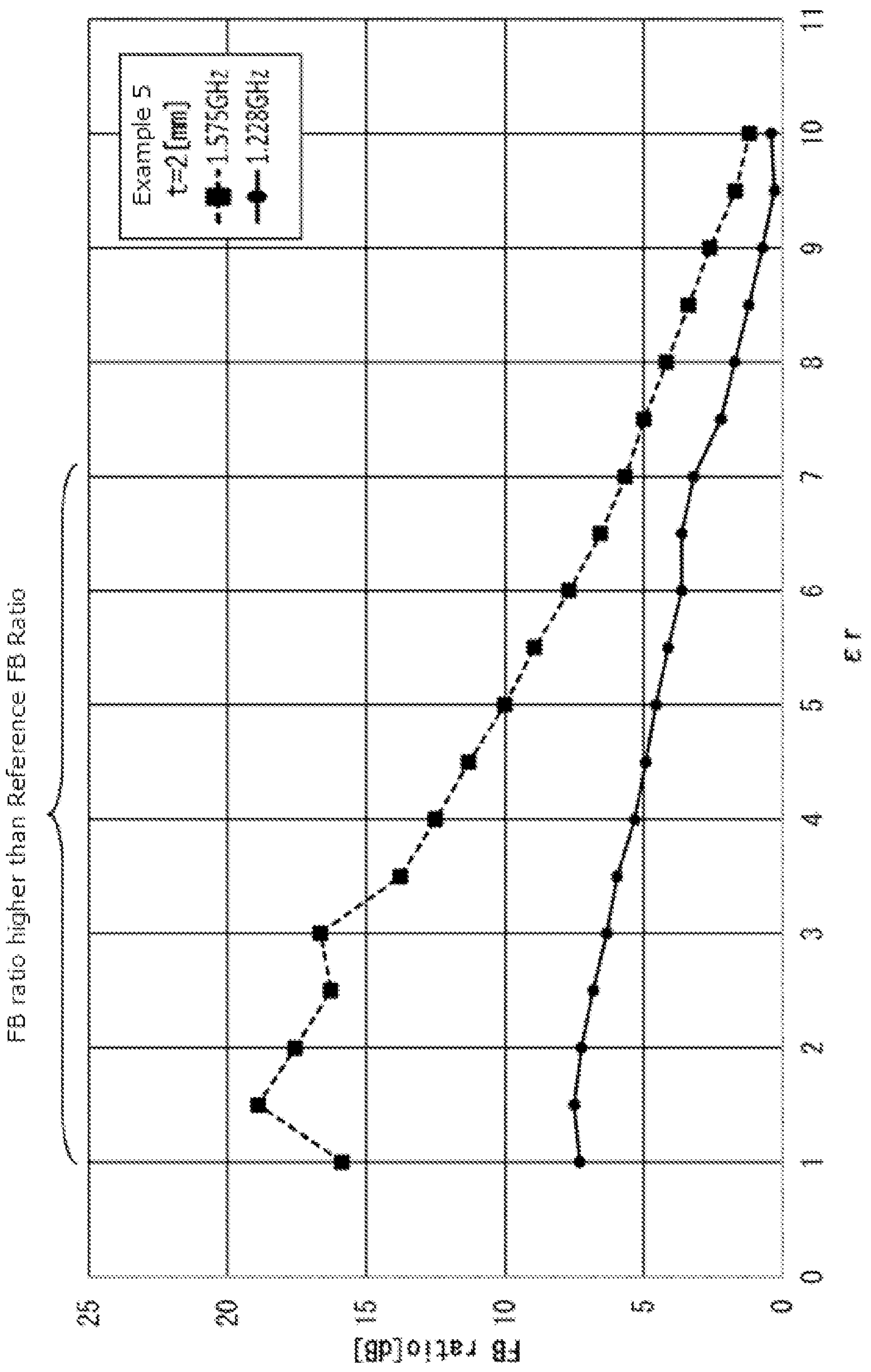
FIG. 19 is a graph showing the relationship between the relative permittivity of the dielectric layer and the FB ratio.

First, FIG. 19 is used to show the relationship between the relative permittivity $\varepsilon_r$ of the dielectric layer 60 and the FB ratio at a dielectric layer 60 thickness of 2 mm. FIG. 19 is a graph showing the relationship between the relative permittivity of the dielectric layer and the FB ratio.

As shown in FIG. 19, when the thickness of the dielectric layer 60 was 2 mm, the FB ratios of the radiating conductors 41, 81 in the vehicle antenna system 500 were higher than the reference FB ratio in the relative permittivity $\varepsilon_r$ range of 1 to 7.1. At each relative permittivity with a higher FB ratio, Equation (5) was satisfied when calculated using a dielectric layer 60 thickness of 2 mm and a frequency f1 of 1575 MHz.

Figure 20:
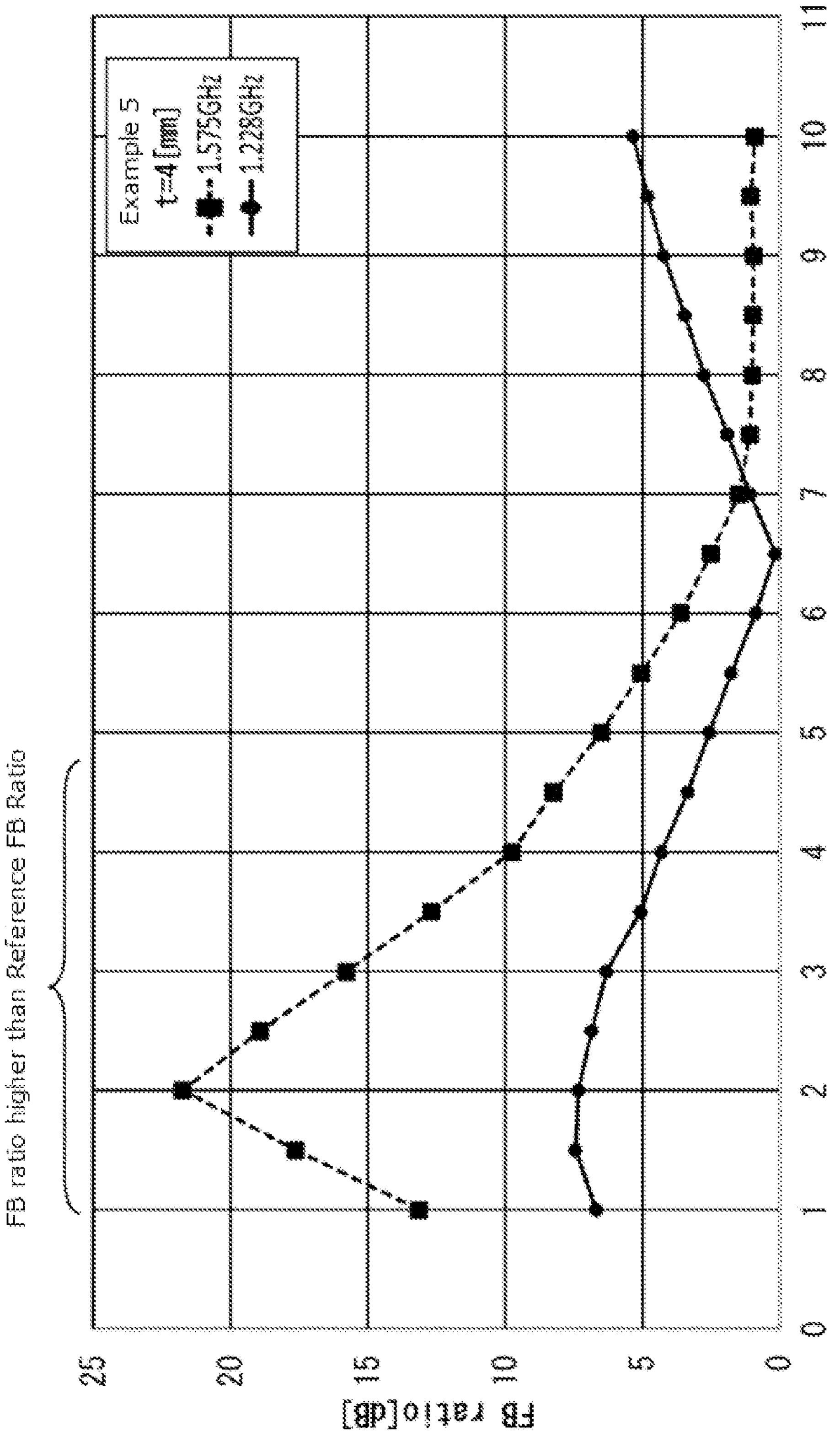
FIG. 20 is a graph showing the relationship between the relative permittivity of the dielectric layer and the FB ratio.

Next, FIG. 20 is used to show the relationship between the relative permittivity $\varepsilon_r$ of the dielectric layer 60 and the FB ratio [dB] at a dielectric layer 60 thickness of 4 mm. FIG. 20 is a graph showing the relationship between the relative permittivity of the dielectric layer and the FB ratio.

As shown in FIG. 20, when thickness t of the dielectric layer 60 was 4 mm, the FB ratios of the radiating conductors 41, 81 in the vehicle antenna system 500 were higher than the reference FB ratio in the relative permittivity $\varepsilon_r$ range of 1 to 4.8. At each relative permittivity with a higher FB ratio, Equation (5) was satisfied when calculated using a dielectric layer 60 thickness of 4 mm and a frequency f1 of 1575 MHz.

Figure 21:
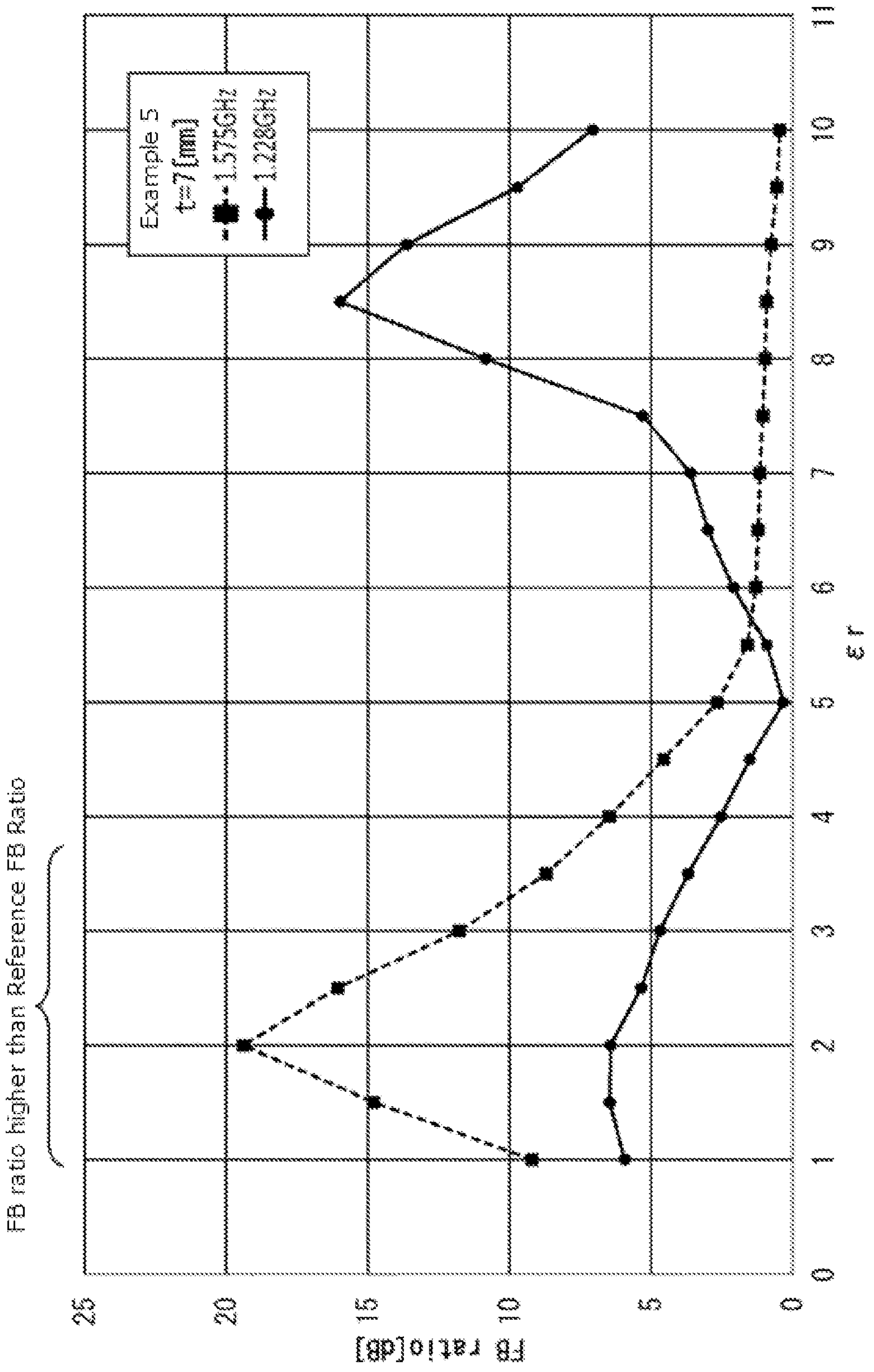
FIG. 21 is a graph showing the relationship between the relative permittivity of the dielectric layer and the FB ratio.

First, FIG. 21 is used to show the relationship between the relative permittivity $\varepsilon_r$ of the dielectric layer 60 and the FB ratio at a dielectric layer 60 thickness of 7 mm. FIG. 21 is a graph showing the relationship between the relative permittivity of the dielectric layer and the FB ratio.

As shown in FIG. 21, when thickness t of the dielectric layer 60 was 7 mm, the FB ratios of the radiating conductors 41, 81 in the vehicle antenna system 500 were higher than the reference FB ratio in the relative permittivity $\varepsilon_r$ range of 1 to 3.8. At each relative permittivity with a higher FB ratio, Equation (5) was satisfied when calculated using a dielectric layer 60 thickness of 7 mm and a frequency f1 of 1575 MHz.

Figure 22:
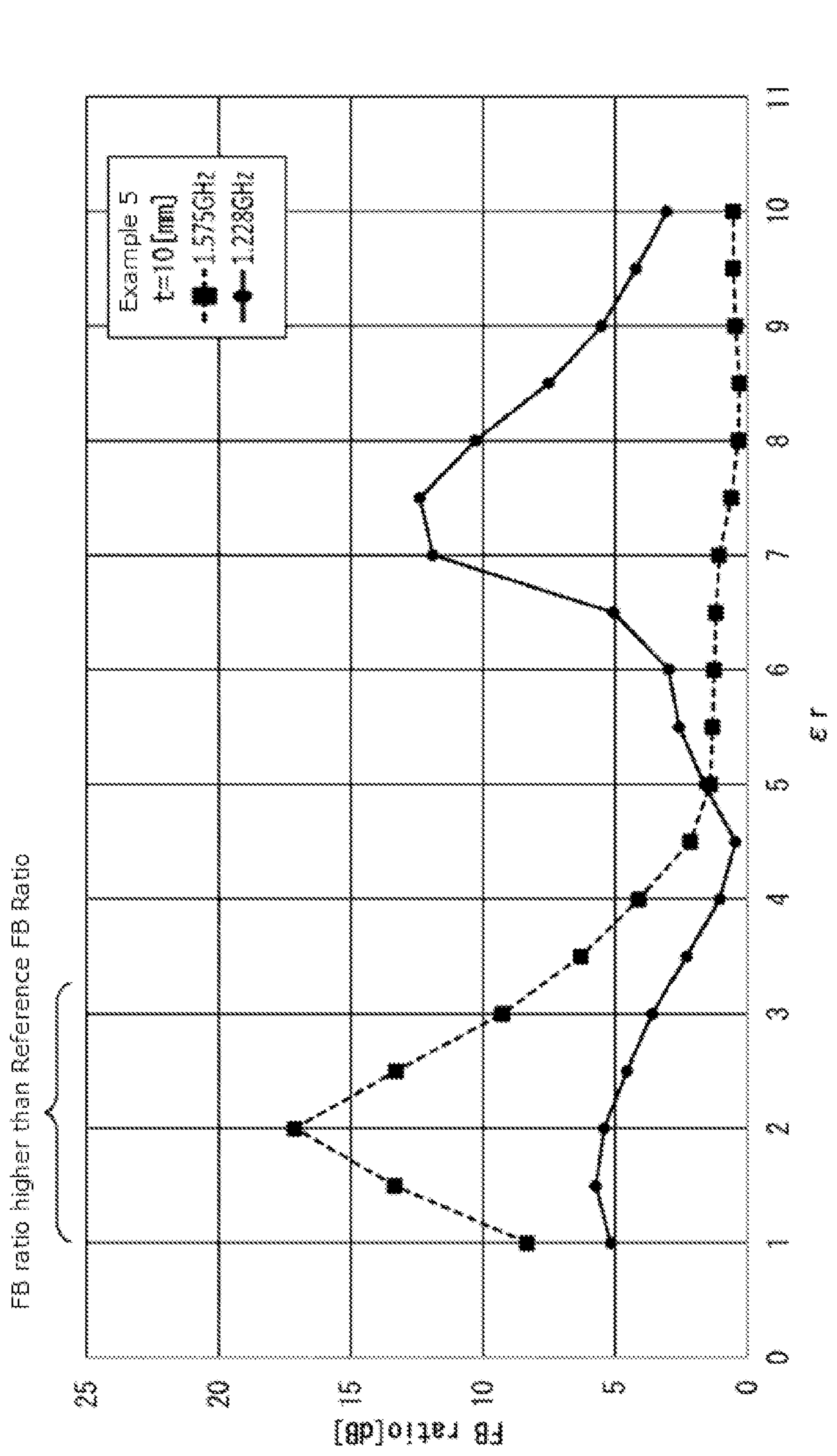
FIG. 22 is a graph showing the relationship between the relative permittivity of the dielectric layer and the FB ratio.

First, FIG. 22 is used to show the relationship between the relative permittivity $\varepsilon_r$ of the dielectric layer 60 and the FB ratio [dB] when the dielectric layer 60 thickness is 10 mm. FIG. 22 is a graph showing the relationship between the relative permittivity of the dielectric layer and the FB ratio.

As shown in FIG. 22, when thickness t of the dielectric layer 60 was 10 mm, the FB ratios of the radiating conductors 41, 81 in the vehicle antenna system 500 were higher than the reference FB ratio in the relative permittivity $\varepsilon_r$ range of 1 to 3.2. At each relative permittivity with a higher FB ratio, Equation (5) was satisfied when calculated using a dielectric layer 60 thickness of 10 mm and a frequency f1 of 1575 MHz.

Figure 23:
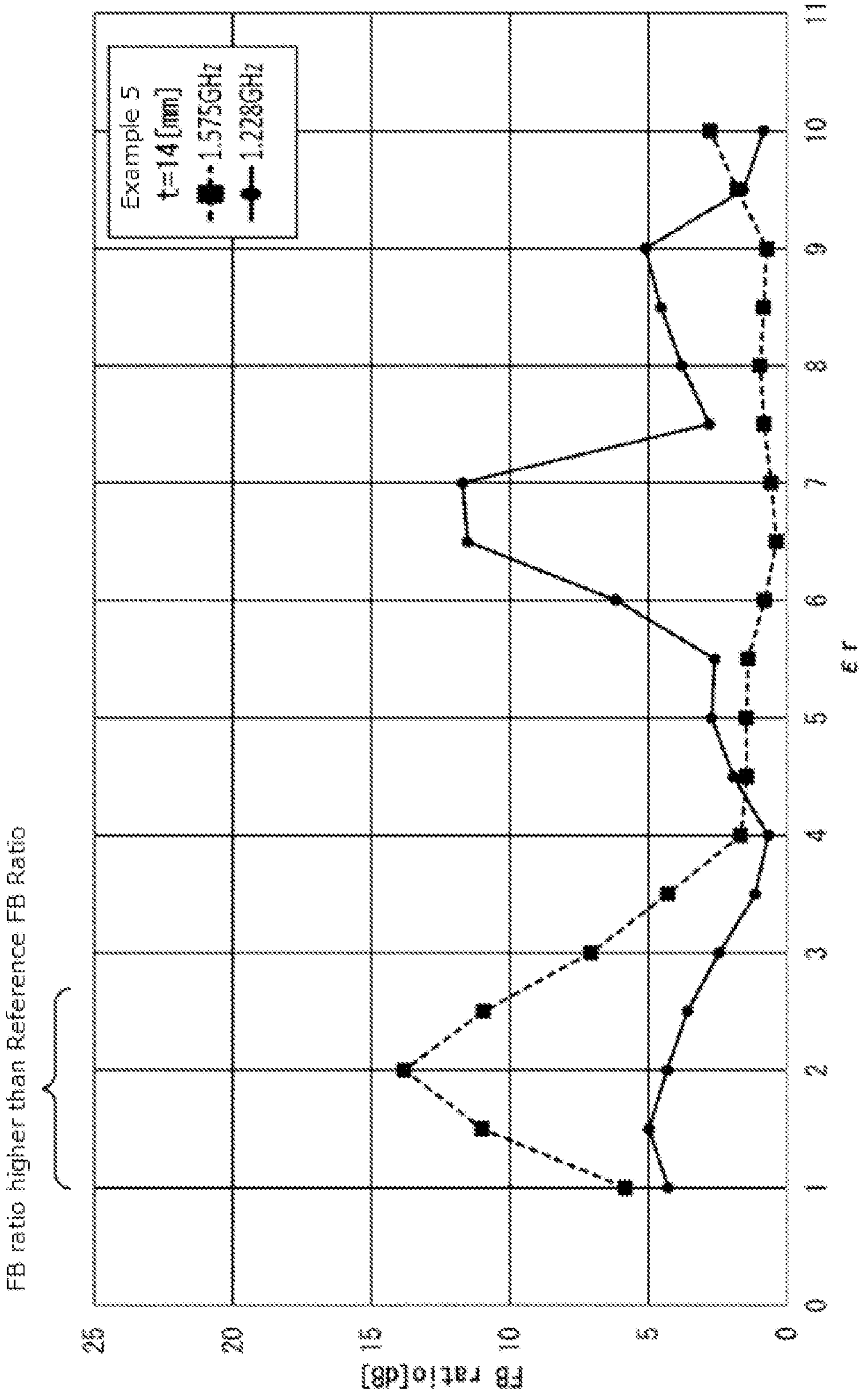
FIG. 23 is a graph showing the relationship between the relative permittivity of the dielectric layer and the FB ratio.

First, FIG. 23 is used to show the relationship between the relative permittivity $\varepsilon_r$ of the dielectric layer 60 and the FB ratio [dB] when the dielectric layer 60 thickness is 14 mm. FIG. 23 is a graph showing the relationship between the relative permittivity of the dielectric layer and the FB ratio.

As shown in FIG. 23, when thickness t of the dielectric layer 60 was 14 mm, the FB ratios of the radiating conductors 41, 81 in the vehicle antenna system 500 were higher than the reference FB ratio in the relative permittivity $\varepsilon_r$ range of 1 to 2.7. At each relative permittivity with a higher FB ratio, Equation (5) was satisfied when calculated using a dielectric layer 60 thickness of 14 mm and a frequency f1 of 1575 MHz.

As described above, the vehicle antenna system 500 according Example 5 can raise the FB ratio higher than the reference FB ratio when the relative permittivity at a dielectric layer 60 minimum thickness $t_{min}$ of 2 mm, 4 mm, 7 mm, 10 mm, and 14 mm satisfies Equation (5). In other words, the vehicle antenna system 500 according to Example 5 can realize high reception performance and thus efficiently receive circularly polarized signals from the zenith direction, such as GNSS signals. Note that the thickness t of the dielectric layer 60 may be 2 mm or less and 14 mm or more. As mentioned above, the thickness t of the dielectric layer 60 may be 0.5 mm or more, 1.0 mm or more, or 1.5 mm or more. Also, the thickness t of the dielectric layer 60 may be 16 mm or less or 15 mm or less.

Example 6

Figure 24:
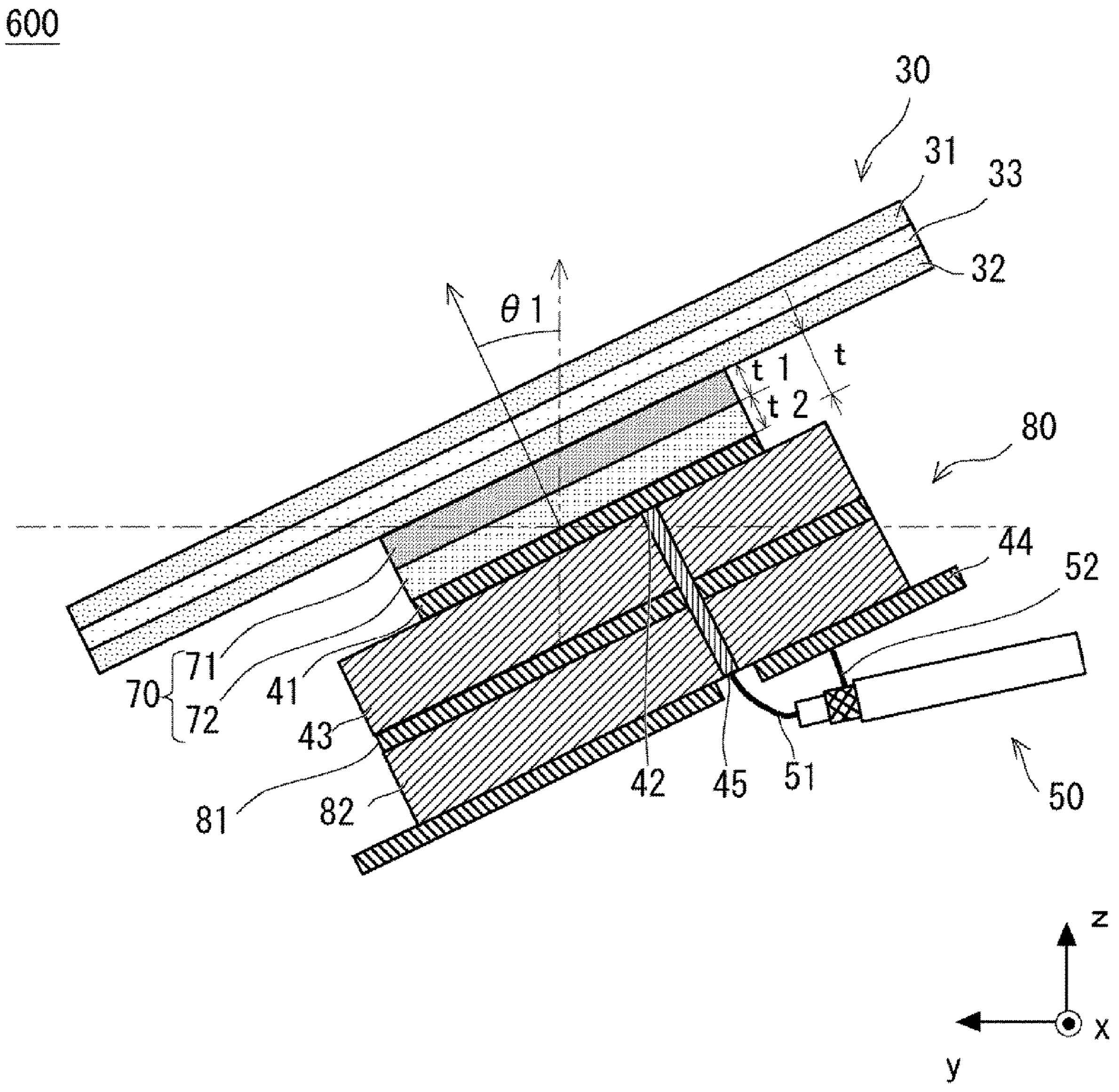
FIG. 24 is a diagram showing a configuration of the vehicle antenna system according to Example 6.

Next, FIG. 24 is used to describe a configuration of the vehicle antenna system 600 according to Example 6. In the vehicle antenna system 600 according to Example 6, the dielectric layer 60 in the vehicle antenna system 500 according to Example 5 is replaced by dielectric layers 70. Specifically, in Example 5, the dielectric layer 60 was composed of a single dielectric layer, but in Example 6, the dielectric layers 70 are composed of a first dielectric layer 71 and a second dielectric layer 72. The configurations of the window glass 30, the antenna element 80, and the coaxial cable 50 are the same as those in Example 5, so further description has been omitted. Also, the dielectric layers 70 are the same as those in Example 3, so further description has been omitted.

The vehicle antenna system 600 according to Example 6 may satisfy a dielectric layer 70 thickness t [mm] of 0.5 mm to 16 mm, as in Example 5. The vehicle antenna system 600 according to Example 6, like Example 5, has a dielectric layer 70 thickness t [mm] of 0.5 mm to 16 mm, and when the frequency of the signals received by the radiating conductor 41 is f1 [MHz], the relative permittivity $\varepsilon_r$ of the dielectric layers 70 may satisfy Equation (5) above.

The relative permittivity $\varepsilon_r$ of the dielectrics layer 70 can be calculated using Equation (2) and Equation (5) using the relative permittivity $\varepsilon_1$ and thickness $t_1$ [mm] of the first dielectric layer 71 and the relative permittivity $\varepsilon_2$ and thickness $t_2$ [mm] of the second dielectric layer 72. In other words, the relative permittivity $\varepsilon_r$ of the dielectric layers 70 can be calculated using the relative permittivity based on the ratio of the thickness of the first dielectric layer 71 and the second dielectric layer 72 in the thickness of the dielectric layer 70.

As mentioned above, in the vehicle antenna system 600 according to Example 6, the dielectric layer 60 in Example 5 has been replaced by dielectric layers 70. However, when the dielectric layer 60 consists of M dielectric layers, the same configuration as the vehicle antenna system 500 according to Example 5 can be realized by using Equation (5) and Equation (3). Therefore, in the vehicle antenna system 600 according to Example 6, as in the vehicle antenna system 500 according to Example 5, high reception performance can be realized and circularly polarized signals efficiently received from the zenith direction, such as GNSS signals.

Example 7

Figure 25:
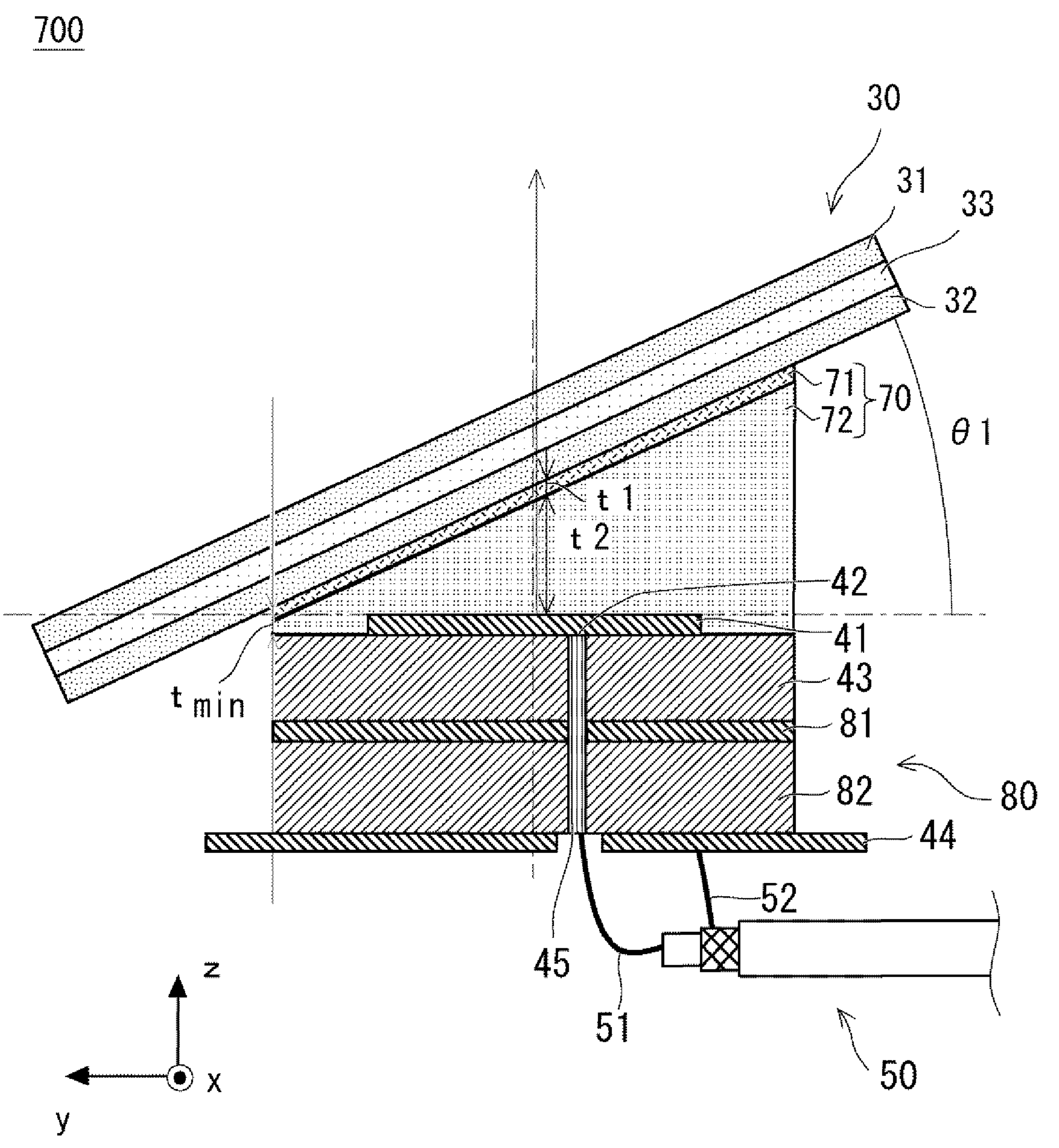
FIG. 25 is a diagram showing a configuration of the vehicle antenna system according to Example 7.

Next, FIG. 25 is used to describe a configuration of the vehicle antenna system 700 according to Example 7. FIG. 25 corresponds to FIG. 11. In the vehicle antenna system 700 according to Example 7, the dielectric layer 60 in the vehicle antenna system 400 according to Example 4 is replaced by dielectric layers 70. Specifically, in Example 4, the dielectric layer 60 was composed of a single dielectric layer, but in Example 7, the dielectric layers 70 are composed of a first dielectric layer 71 and a second dielectric layer 72. The configurations of the window glass 30, the antenna element 80, and the coaxial cable 50 are the same as those in Example 5, so further description has been omitted.

The dielectric layers 70 include a first dielectric layer 71 and a second dielectric layer 72. The first dielectric layer 71 is an air layer adjacent to the inner surface of the window glass 30. The first dielectric layer 71 is a dielectric layer with a constant thickness. The second dielectric layer 72 is a non-air layer adjacent to the first dielectric layer 71. The dielectric layers 70 can also be a combination in which the first dielectric layer 71 is a non-air layer and the second dielectric layer is an air layer. The dielectric layers 70 can also be a combination in which the first dielectric layer 71 is a first non-air layer and the second dielectric layer 72 is a second non-air layer. In this case, the relative permittivity of the first non-air layer is different from that of the second non-air layer. The second dielectric layer 72 is formed between the first principal plane of the dielectric substrate 43 and the first dielectric layer 71. The thickness of the second dielectric layer 72 varies depending on the y-coordinate. The thickness of the second dielectric layer 72 is formed so that the thickness of the second dielectric layer 72 increases as it moves toward the y-axis negative direction. In other words, the second dielectric layer 72 is formed so that the distance between the first principal plane of the dielectric substrate 43 and the boundary surface of the second dielectric layer 72 increases as the y-axis negative direction increases.

The vehicle antenna system 700 according to Example 7 may satisfy a dielectric layer 70 minimum thickness $t_{min}$ [mm] of 0.5 mm to 16 mm, as in Example 4. Also, as in Example 4, the vehicle antenna system 700 according to Example 7 may also have a dielectric layer 70 relative permittivity εr that satisfies Equation (4) when the minimum thickness $t_{min}$ [mm] of the dielectric layers 70 is 0.5 mm to 16 mm.

The relative permittivity $\varepsilon_r$ of the dielectric layers 70 may be calculated using Equations (2) and (4) from the relative permittivity of the first dielectric layer 71, the thickness of the first dielectric layer 71 at the center of gravity of radiating conductor 41, the relative permittivity of the second dielectric layer 72, and the thickness of the second dielectric layer 72 at the center of gravity of radiating conductor 41. Specifically, if the thickness of the first dielectric layer 71 at the center of gravity of radiating conductor 41 is thickness $t_1$ [mm] and the thickness of the second dielectric layer 72 at the center of gravity of radiating conductor 41 is thickness $t_2$ [mm], then the relative permittivity $\varepsilon_r$ of the dielectric layers 70 may be calculated by Equation (2) and Equation (4). When the dielectric layers 70 are composed of M dielectric layers, the relative permittivity $\varepsilon_r$ of the dielectric layers 70 can be calculated by using Equation (3) and Equation (4).

As mentioned above, a configuration for the vehicle antenna system 700 according to Example 7 that is similar to the configuration for the vehicle antenna system 400 according to Example 4 can be realized using Equation (4) and Equation (2), when the dielectric layer 60 in Example 4 is replaced by dielectric layers 70. Also, when the vehicle antenna system 700 according to Example 7 has three or more dielectric layers 70, the same configuration as the vehicle antenna system 400 according to Example 4 can be realized by using Equation (4) and Equation (3). Therefore, in the vehicle antenna system 700 according to Example 7, as in the vehicle antenna system 500 according to Example 4, high reception performance can be realized and circularly polarized signals efficiently received from the zenith direction, such as GNSS signals.

Note that in FIG. 25, the first dielectric layer 71 is a dielectric layer with a constant thickness regardless of the y-coordinate, but the first dielectric layer 71 may be formed so that its thickness increases as one moves toward the negative y-axis direction. The first dielectric layer 71 and the second dielectric layer 72 may be formed so that the ratio of the thickness of the first dielectric layer 71 to the thickness of the second dielectric layer 72 is constant regardless of the y-coordinate. In this way, as with the vehicle antenna system 700 in Example 7, high reception performance can be realized, so that circularly polarized signals from the zenith direction, such as GNSS signals, can be received efficiently.

The present invention is not limited to the embodiments described above. The present invention includes all variations, modifications, and combinations devisable by a person skilled in the art that fall within the scope of the claims in the claims section of the present application.

The present application claims priority based on Japanese Application No. JP 2021-82333 A filed on May 14, 2021, the entire disclosure of which is hereby incorporated.

REFERENCE NUMBERS, LETTERS, AND CHARACTERS

20: Vehicle
30: Window glass
31: First glass plate
32: Second glass plate
33: Interposed film
40, 80: Antenna element
41: Radiating conductor
41*a*, 41*b*: Cutaway portion
42: Power supply point
43: Dielectric substrate
44: Grounding conductor
45: Conductor
50: Coaxial cable
51: Signal line
52: Ground wire
60, 70: Dielectric layer
71: First dielectric layer
72: Second dielectric layer
81: Radiating conductor
82: Dielectric substrate
100, 200, 300, 400, 500, 600, 700: Vehicle antenna system The embodiments of the invention in which an exclusive property or privilege is claimed are defined as follows:

1. A vehicle antenna system comprising:
a window glass for a vehicle; and
an antenna element that is able to receive signals in a predetermined frequency band, the antenna element including:

- a first radiating conductor that is provided on a first principal plane of a first dielectric substrate and that is able to receive circularly polarized signals of a first frequency,
- a second radiating conductor positioned opposite the first radiating conductor via the first dielectric substrate, the second radiating conductor is able to receive circularly polarized waves of a second frequency that is lower than the first frequency, and
- a grounding conductor positioned opposite the first radiating conductor and the second radiating conductor via a second dielectric substrate, wherein the normal direction of the first principal plane is less than or equal to 45° relative to the vertical direction, wherein the first radiating conductor is positioned away from the inner surface of the window glass via a dielectric layer in the direction of the vehicle interior, and wherein the first radiating conductor is positioned non-parallel to the inner surface of the window glass at an angle of 20° to 25° to the inner surface of the window glass, and the inequality $$1 \le \varepsilon_r \le 7.11882 \times t_{min}^{-0.385302}$$

is satisfied at 0.5 mm≤$t_{min}$≤16 mm, where the relative permittivity of the dielectric layer is Er and the minimum thickness of the dielectric layer is $t_{min}$ [mm].

2. The vehicle antenna system according to claim 1, wherein the dielectric layer includes an air layer.

3. The vehicle antenna system according to claim 1, wherein the window glass is a windshield.

4. The vehicle antenna system according to claim 1, wherein the window glass is roof glass.

5. A vehicle antenna system comprising:

a window glass for a vehicle; and an antenna element that is able to receive signals in a predetermined frequency band, the antenna element including:

- a first radiating conductor that is provided on a first principal plane of a first dielectric substrate and that is able to receive circularly polarized signals of a first frequency,
- a second radiating conductor positioned opposite the first radiating conductor via the first dielectric substrate, the second radiating conductor is able to receive circularly polarized waves of a second frequency that is lower than the first frequency, and
- a grounding conductor positioned opposite the first radiating conductor and the second radiating conductor via a second dielectric substrate, wherein the normal direction of the first principal plane is less than or equal to 45° relative to the vertical direction, wherein the first radiating conductor is positioned away from the inner surface of the window glass via a dielectric layer in the direction of the vehicle interior, and wherein the first radiating conductor is positioned parallel to the inner surface of the window glass, and at least one of the following inequalities $$1 \le \varepsilon_r \le (-0.097648 \times f + 173.47) \times t(^{0.000125185 \times f \times f - 0.395272 \times f + 311.375}), \text{ and}$$

$$1 \le \varepsilon_r \le \left(-0.00197869 \times f^2 + 6.18143 \times f + 4817.72\right) \times t^{(0.0001538 \times f \times f - 0.317206 \times f + 247.206)}$$

are satisfied at 0.5 mm≤t≤16 mm, where the relative permittivity of the dielectric layer is er, the thickness of the dielectric layer is t [mm], and the first frequency is f [MHz].

6. The vehicle antenna system according to claim 2, wherein the dielectric layer further includes a non-air layer adjacent to the air layer that is different from air.

7. The vehicle antenna system according to claim 6, wherein the air layer is adjacent to the inner surface of the window glass.

8. The vehicle antenna system according to claim 5, wherein the dielectric layer includes an air layer.

9. The vehicle antenna system according to claim 8, wherein the dielectric layer further includes a non-air layer adjacent to the air layer that is different from air.

10. The vehicle antenna system according to claim 9, wherein the air layer is adjacent to the inner surface of the window glass.

11. The vehicle antenna system according to claim 5, wherein the window glass is mounted at an angle of 0° to 30° to the horizontal plane.

12. The vehicle antenna system according to claim 5, wherein the window glass is a windshield.

13. The vehicle antenna system according to claim 5, wherein the window glass is roof glass, and wherein a plane of the first radiating conductor is parallel to the horizontal plane.

* * * * *